(12) United States Patent
Nayar

(10) Patent No.: US 9,553,544 B2
(45) Date of Patent: Jan. 24, 2017

(54) SUPPORT RACKING FOR SOLAR PANEL

(71) Applicant: Polar Racking Inc, Windsor (CA)

(72) Inventor: Manish Nayar, Windsor (CA)

(73) Assignee: Polar Racking Inc., Windsor (CA)

( * ) Notice: Subject to any disclaimer, the term of this patent is extended or adjusted under 35 U.S.C. 154(b) by 58 days.

(21) Appl. No.: 14/507,379

(22) Filed: Oct. 6, 2014

(65) Prior Publication Data

US 2015/0101996 A1    Apr. 16, 2015

(30) Foreign Application Priority Data

Oct. 11, 2013  (CA) ...................... 2829919
Oct. 18, 2013  (CA) ...................... 2830914

(51) Int. Cl.
*H02S 20/30* (2014.01)
*F16M 11/00* (2006.01)
*F16M 13/02* (2006.01)
*H02S 20/23* (2014.01)
*H02S 20/24* (2014.01)
*F24J 2/52* (2006.01)
*F24J 2/54* (2006.01)

(52) U.S. Cl.
CPC ................ *H02S 20/30* (2014.12); *F24J 2/526* (2013.01); *F24J 2/5233* (2013.01); *F24J 2/5239* (2013.01); *F24J 2/5258* (2013.01); *H02S 20/23* (2014.12); *H02S 20/24* (2014.12); *F24J 2/5264* (2013.01); *F24J 2/541* (2013.01); *F24J 2002/5281* (2013.01); *F24J 2002/5486* (2013.01); *Y02B 10/12* (2013.01); *Y02B 10/20* (2013.01); *Y02E 10/47* (2013.01)

(58) Field of Classification Search
CPC .......... H02S 20/23; H02S 20/24; H02S 20/30; F24J 2/5239; F24J 2/526; F24J 2/5258; F24J 2/5233; F24J 2/5264; F24J 2/541; Y02E 10/47; Y02E 10/12; Y02E 10/20
USPC ....................................... 211/192
See application file for complete search history.

(56) References Cited

U.S. PATENT DOCUMENTS 3,727,271 A * 4/1973 Znamirowski ........ F16B 21/086
                                                    411/508
4,421,943 A   12/1983 Withjack
(Continued)

OTHER PUBLICATIONS

Canadian Intellectual Property Office, Office Action on related application (Apr. 23, 2015).

*Primary Examiner* — Stanton L Krycinski
(74) *Attorney, Agent, or Firm* — Kolisch Hartwell, P.C.

(57) ABSTRACT

A supporting rack for a solar panel with a framework mountable on a surface such as a roof, this framework including two elongate runners extending parallel to each other and a cross-member extending between and connecting the two runners. Upper and lower clamp assemblies detachably and adjustably mount the solar panel on top of the framework so that the panel extends at an acute angle to the plane of the runners. There are two front clamp assemblies, each mountable on a respective runner and clamped to a front edge of the solar panel. A clevis pin connection pivotally connects the clamping mechanism to its respective runner. Two upper, rear clamp assemblies each have an adjustable J-clamp member and a back plate. After installation of the rack, the panel is pivotable from an operating position at an acute angle to the runners to a greater angle to facilitate maintenance or repair.

18 Claims, 24 Drawing Sheets

(56) References Cited

U.S. PATENT DOCUMENTS

| | | | |
|---|---|---|---|
| 6,046,399 A * | 4/2000 | Kapner | F24J 2/045 136/244 |
| 6,065,255 A | 5/2000 | Stern | |
| 6,414,237 B1 | 7/2002 | Boer | |
| 6,672,018 B2 * | 1/2004 | Shingleton | F24J 2/5205 126/621 |
| 6,745,869 B2 * | 6/2004 | Garrett | B23D 45/003 182/45 |
| 7,605,574 B2 | 10/2009 | Dearn | |
| 8,505,248 B1 * | 8/2013 | Leong | H01L 31/024 52/173.3 |
| 8,558,101 B2 * | 10/2013 | Mascolo | F24J 2/4636 136/243 |
| 8,893,445 B2 * | 11/2014 | Yen | F16C 11/04 126/623 |
| 9,052,123 B2 * | 6/2015 | Anderson | F24J 2/5233 |
| 9,093,948 B2 * | 7/2015 | Walz | H02S 20/24 |
| 9,109,814 B2 * | 8/2015 | Patton | F24J 2/4607 |
| 9,159,857 B2 * | 10/2015 | Kuo | H01L 31/042 |
| 2003/0101662 A1 * | 6/2003 | Ullman | E04D 13/12 52/27 |
| 2003/0177706 A1 * | 9/2003 | Ullman | E04D 13/12 52/3 |
| 2007/0266672 A1 | 11/2007 | Bateman | |
| 2008/0105489 A1 * | 5/2008 | Garrett | E04D 15/00 182/45 |
| 2009/0114269 A1 * | 5/2009 | Fletcher | F24J 2/4607 136/251 |
| 2010/0089390 A1 | 4/2010 | Miros | |
| 2010/0212720 A1 * | 8/2010 | Meyer | F24J 2/16 136/246 |
| 2010/0236183 A1 | 9/2010 | Cusson | |
| 2010/0243827 A1 | 9/2010 | Zante | |
| 2010/0269888 A1 * | 10/2010 | Johnston, Jr. | F24J 2/5232 136/251 |
| 2011/0240101 A1 * | 10/2011 | Sagayama | F24J 2/4614 136/251 |
| 2011/0253193 A1 * | 10/2011 | Korman | F24J 2/36 136/245 |
| 2012/0037214 A1 * | 2/2012 | Sagayama | F24J 2/523 136/251 |
| 2012/0045286 A1 | 2/2012 | Oliveira | |
| 2012/0080078 A1 | 4/2012 | Farrelly | |
| 2012/0125869 A1 | 5/2012 | Abar | |
| 2012/0186632 A1 * | 7/2012 | Reinhold | F24J 2/4638 136/251 |
| 2012/0223032 A1 | 9/2012 | Rothschild | |
| 2012/0223033 A1 * | 9/2012 | Molek | F16B 7/18 211/41.1 |
| 2012/0240489 A1 | 9/2012 | Rivera | |
| 2012/0285515 A1 * | 11/2012 | Sagayama | F24J 2/5211 136/251 |
| 2012/0298201 A1 | 11/2012 | Stephan | |
| 2012/0318322 A1 * | 12/2012 | Lanyon | F24J 2/5264 136/244 |
| 2013/0092215 A1 | 4/2013 | Schroeder | |
| 2013/0112248 A1 * | 5/2013 | McPheeters | F16B 2/065 136/251 |
| 2013/0200245 A1 | 8/2013 | Markiewicz | |
| 2013/0234645 A1 | 9/2013 | Goei | |
| 2013/0240015 A1 | 9/2013 | Chaimovski | |
| 2013/0247962 A1 | 9/2013 | Sakai | |
| 2014/0083488 A1 * | 3/2014 | Song | H01L 31/0422 136/251 |
| 2014/0182663 A1 * | 7/2014 | Kuo | H01L 31/0422 136/251 |
| 2014/0360951 A1 * | 12/2014 | Ilzhoefer | F24J 2/5233 211/41.1 |
| 2015/0222220 A1 * | 8/2015 | Laitila | H02S 20/23 211/41.1 |
| 2015/0256120 A1 * | 9/2015 | Anderson | H02S 20/10 136/251 |
| 2016/0020722 A1 * | 1/2016 | Patton | H02S 20/24 136/251 |

\* cited by examiner

SUPPORT RACKING FOR SOLAR PANEL

STATEMENT OF RELATED APPLICATIONS

This application claims foreign priority on Canadian Patent Application No. 2,829,919 having a filing date of 11 Oct. 2014 and Canadian Patent Application No. 2,830,914 having a filing date of 18 Oct. 2014.

BACKGROUND OF THE INVENTION

Technical Field

This invention relates to support systems and support racks for solar panels used to generate electrical power from solar radiation.

Prior Art

It is known to provide a racking system designed to support solar panels on a roof or a flat surface. One such system is sold by SunLink Corporation. One of their roof mount systems includes horizontal runners mounted on support blocks that rest on the roof surface and vertical posts that support the solar panels at a suitable angle to the horizontal. One problem with known systems however is that they may be difficult to repair and maintain or that they may not allow easy access to the underlying roof.

There is a need for an improved support racking for solar panels that will enable the panel to be readily pivoted from an upright position (where maintenance and repairs can be carried out) to a sloping, operating position and then later back to the upright position, if required.

BRIEF SUMMARY OF THE INVENTION

According to one embodiment of the invention, a supporting rack for a solar panel comprises a framework adapted for mounting on a support surface, this framework including two elongate runners that are spaced apart and parallel to each other, and an elongate cross-member extending between and connecting the two runners. There is also a mechanism for detachably and adjustably mounting the solar panel on top of the framework so that the solar panel in use extends at an acute angle to a plane defined by the two runners. This mounting mechanism includes two front clamp assemblies, each mountable on a respective one of the runners and clamped to a front edge of the solar panel. Each clamp assembly includes a clamping mechanism for clamping the front edge in a detachable manner and a pivot pin connection for pivotally connecting the clamping mechanism to a respective one of the runners. After installation of the supporting rack on the support surface, the solar panel can be pivoted from the acute angle to the plane of the runners, which is an operating position for generating electrical power from sun radiation, to a greater angle to the plane for facilitating maintenance, repair or inspection of one or more of the solar panel, the support racking and the support surface.

According to an exemplary form of this supporting rack, there is also a respective second clamping mechanism for mounting another solar panel, pivotally mounted on each pivot pin connection.

An exemplary version of the present clamping system enables the attached solar panel to be tilted in the range of 0° to 35°. One version of the support racking with its the front clamp assemblies has a locking mechanism that keeps the solar panel upright while installers are wiring the system or performing maintenance.

There is also disclosed herein an improved upper clamp assembly that enables the top of the solar module to be locked in place against a back plate of the upper clamp assembly. This clamp assembly can engage the solar panel where it is strongest along the profile of the upper frame, thereby providing a strong, rigid connection.

According to a further aspect of the invention, a supporting rack for a solar panel comprises a framework adapted for mounting on a support surface, this framework including two elongate runners that are spaced-apart and parallel to each other and an elongate cross-member extending between and connecting the two runners. There is also a mounting mechanism for detachably and adjustably mounting the solar panel on top of the framework so that the solar panel in use extends at an acute angle to a plane defined by the two runners. The mounting mechanism include a vertically extending, elongate connecting mechanism extending between and connecting rear sections of the two runners and two rear clamp assemblies, each having a back plate formed with a forwardly extending guideway defining a guide path. Each rear clamp assembly also includes a J-clamp member having a top flange projecting towards the back plate and an integral guide pin slidably mounted in the guideway. In addition, there is a threaded fastening device connecting the J-clamp member to the back plate whereby a tightening of the fastening device pulls the J-clamp member towards its back plate. The rear clamp assemblies are mounted on opposite end sections of the connecting mechanism and are arranged to clamp a top edge frame member of the solar panel.

In an exemplary version of this supporting rack, the connecting mechanism includes an elongate wind deflecting plate and two end plates each mounted on a respective one of the runners and each connected to a respective bottom corner of the wind deflecting plate.

According to another embodiment of the invention, a supporting rack for a solar panel includes two separate elongate runners adapted for mounting on a fixed support surface so that the runners are spaced apart from and parallel to each other. Each runner is formed with a longitudinal connecting channel extending along a top of the runner. The rack further includes at least one separate elongate frame member for connecting the two runners and two panel clamping assemblies, each pivotably mounted on a respective one of the two runners. Each of these assemblies includes a connecting device engagable with sides of the respective connecting channel to secure the panel clamping assembly to the top of its runner. In use, each connecting device can be disengaged from the sides of its respective connecting channel to allow the connecting device and the rest of its clamping assembly to be moved in a lengthwise direction along their runner to a desired position for supporting the solar panel.

There is also disclosed herein an improved runner for solar racking that can be provided with rubber or rubber like pads which can be fastened to the bottom of the runner to protect the roof. Also a sheet metal wire cap can be clipped onto the side of the runner to hide wiring.

BRIEF DESCRIPTION OF THE DRAWINGS

Further features and advantages of the present support racking will be apparent from the following detailed description taken in conjunction with the drawings.

In the drawings.

DETAILED DESCRIPTION OF PREFERRED EMBODIMENTS

Figure 1:
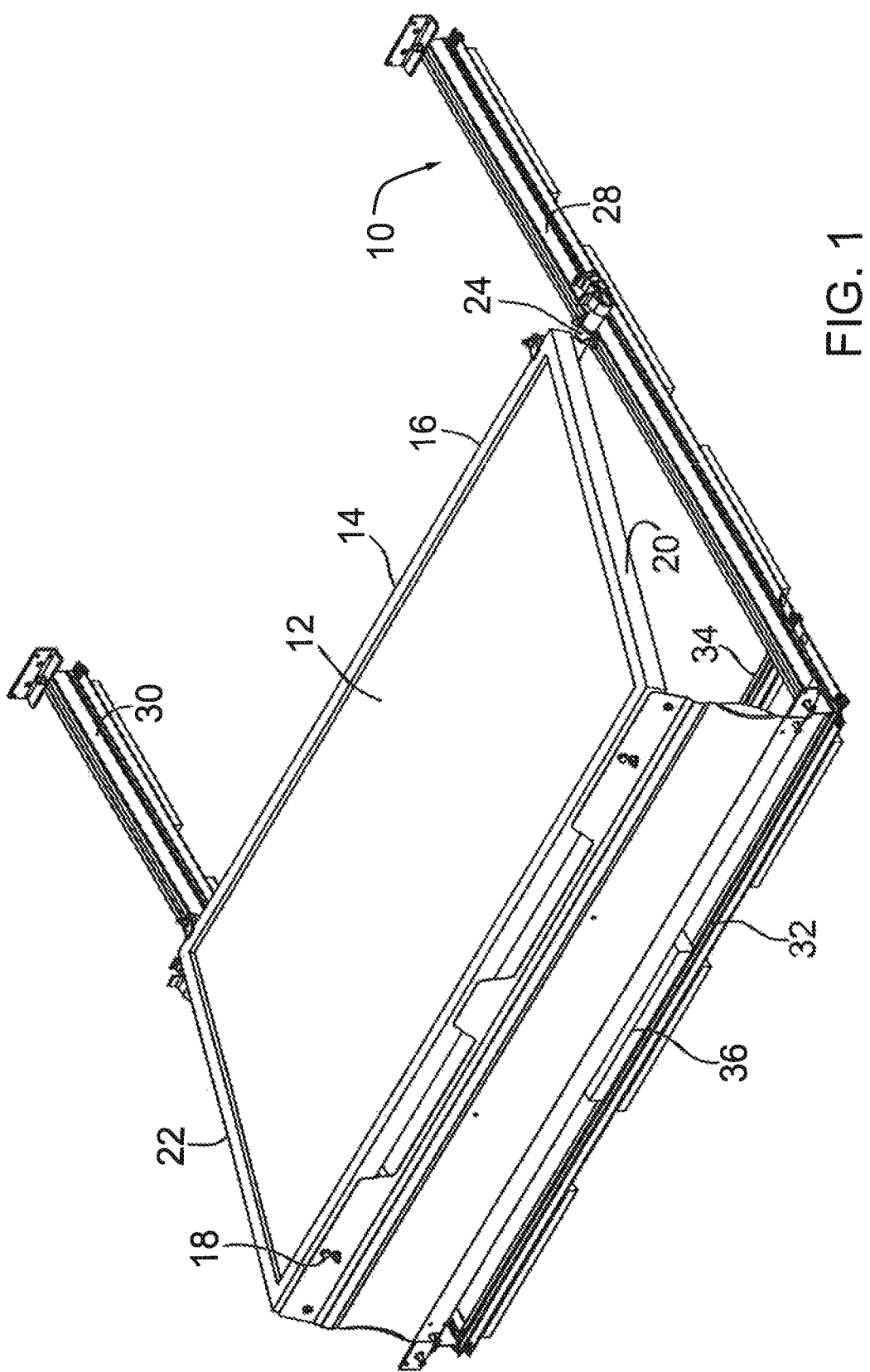
FIG. 1 is a perspective view of the combination of a support racking constructed in accordance with one embodiment of the invention and a solar panel, this view taken from above and from a rear side.
Figure 2:
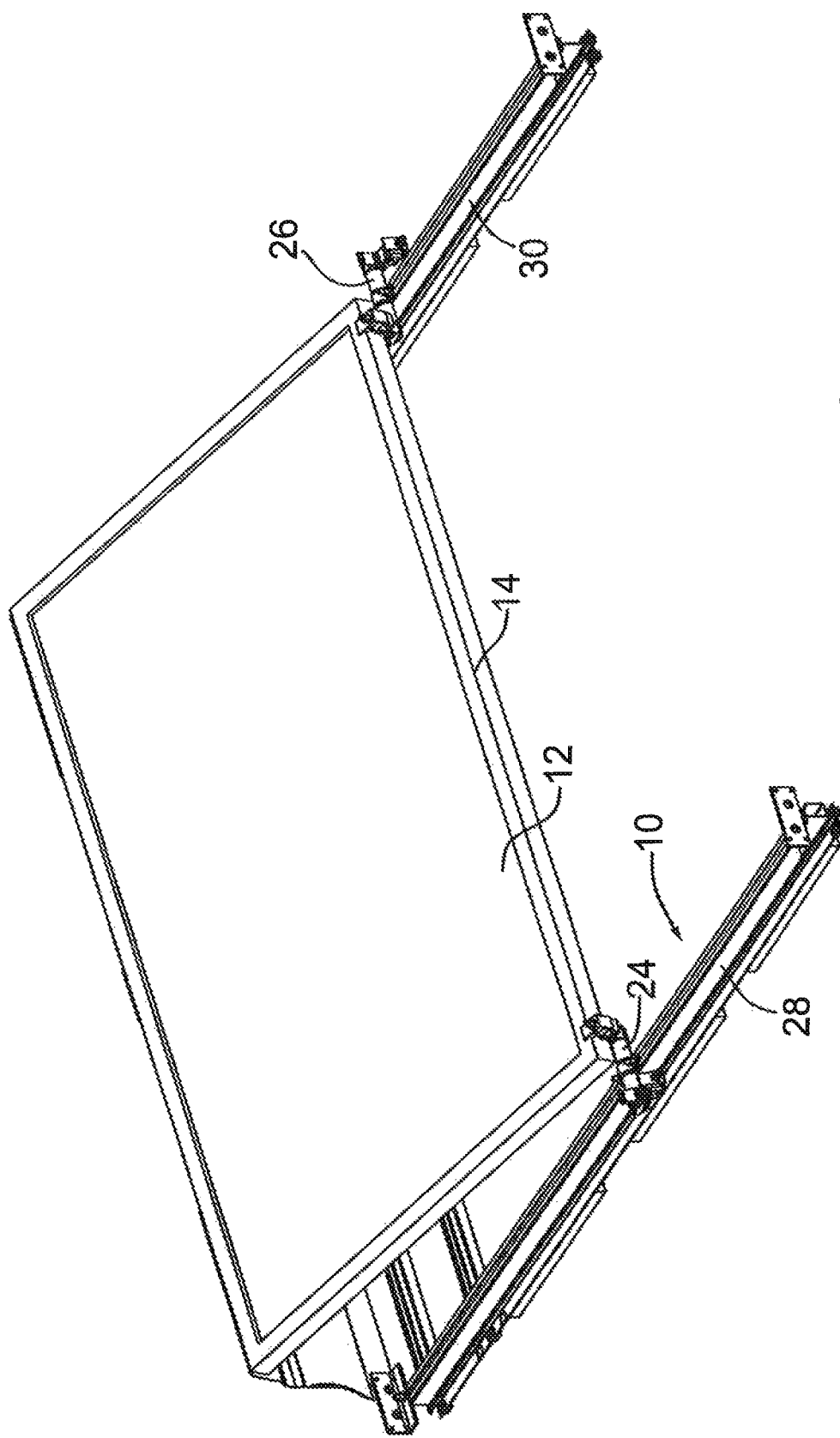
FIG. 2 is another perspective view of the combination of racking and panel of FIG. 1, this view being taken from above and from the front end of the racking.
Figure 3:
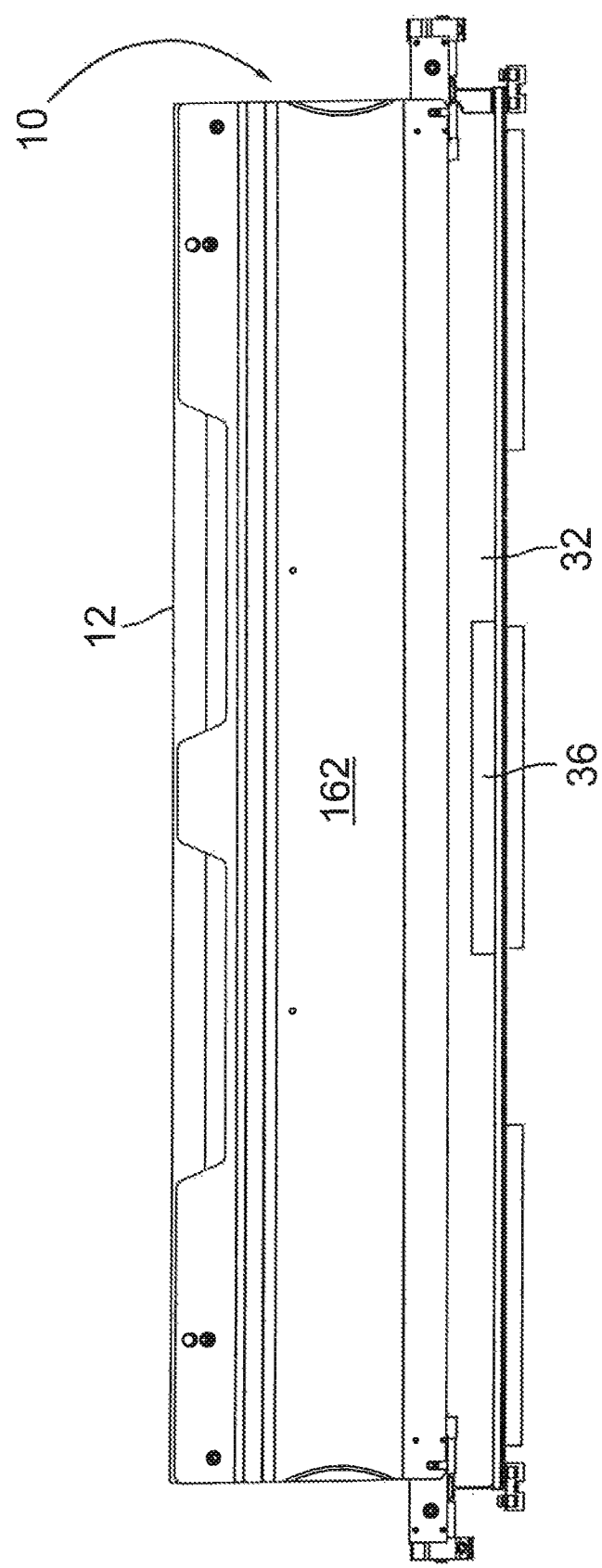
FIG. 3 is a rear view of the support racking of FIG. 1, this view showing a wind deflector.
Figure 4:
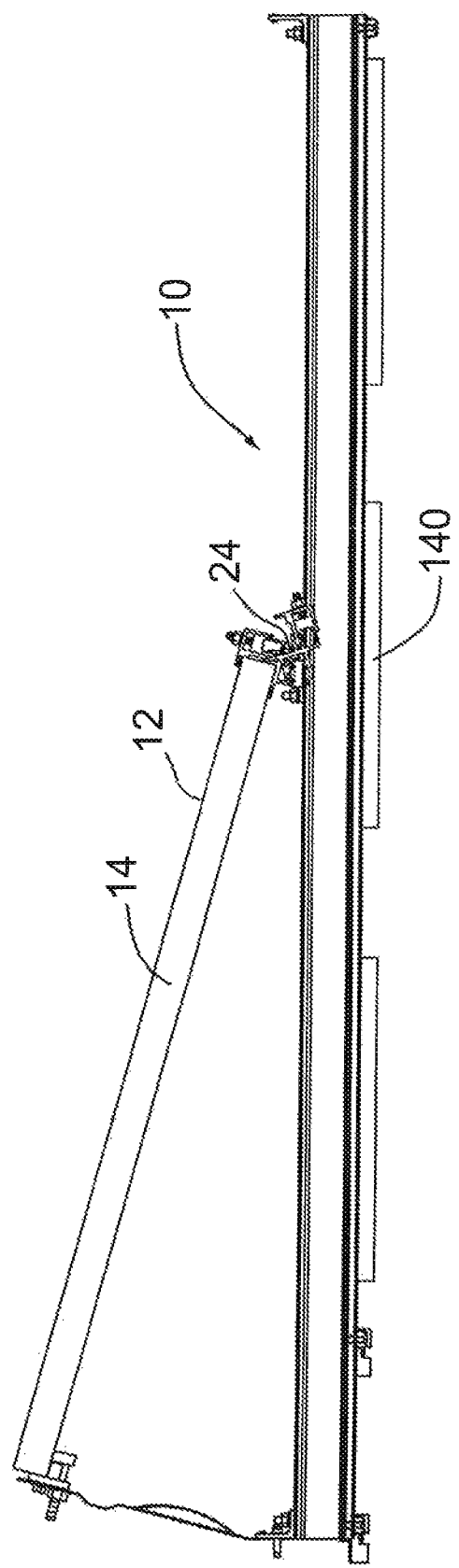
FIG. 4 is a side elevation of the combined racking and panel of FIG. 1.
Figure 5:
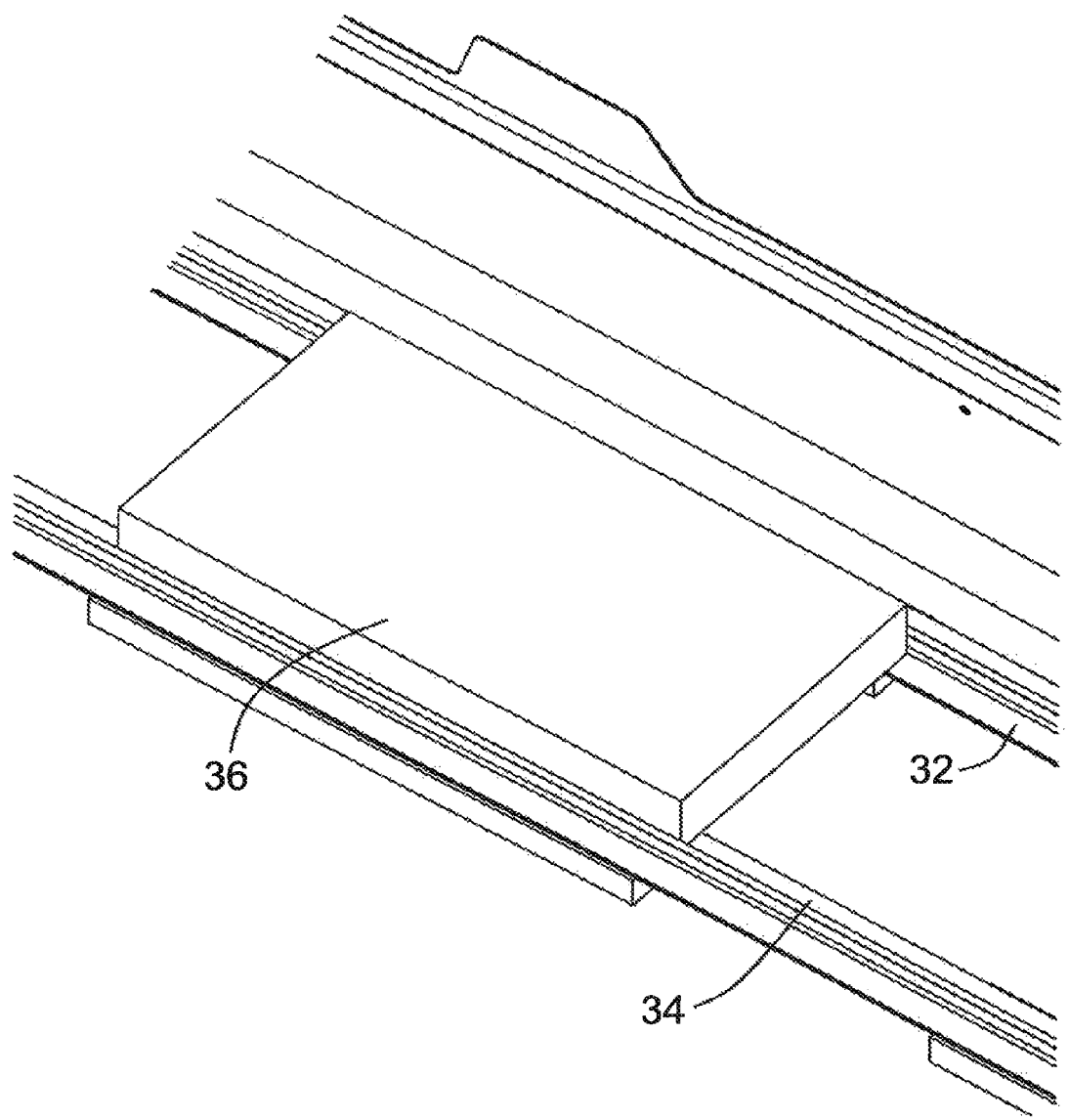
FIG. 5 is a detail view showing a ballast stone mounted on two cross members of the racking.

FIGS. 1 to 4 illustrate a support racking 10 constructed in accordance with one embodiment of the invention. Mounted at an angle on top of the support racking is a standard solar panel 12 having a rectangular shape. The perimeter of the solar panel can be formed by a rectangular metal frame 14. With the solar panel in the sloping position shown, the metal frame has a bottom frame member 16, a top frame 18 and two parallel side frame members 20 and 22. The solar panel with its frame is detachably mounted on top of the racking. The mounting arrangement includes two front clamp assemblies 24, 26. The clamp assembly 24 is shown in more detail in FIGS. 6 and 7 and it will be understood that the clamp assembly 26 is of similar construction.

Two major components of the support racking are two elongate, parallel runners 28, 30 as well as two elongate parallel cross-members 32, 34. Mounted on the cross members is at least one ballast stone 36. Although only one ballast stone is shown, the actual number of ballast stones used and mounted on the cross-members will depend upon weight requirements as determined by engineering calculations. If no ballast stone is required, the racking may include only one cross-member used to connect and properly space the runners.

Figure 6:
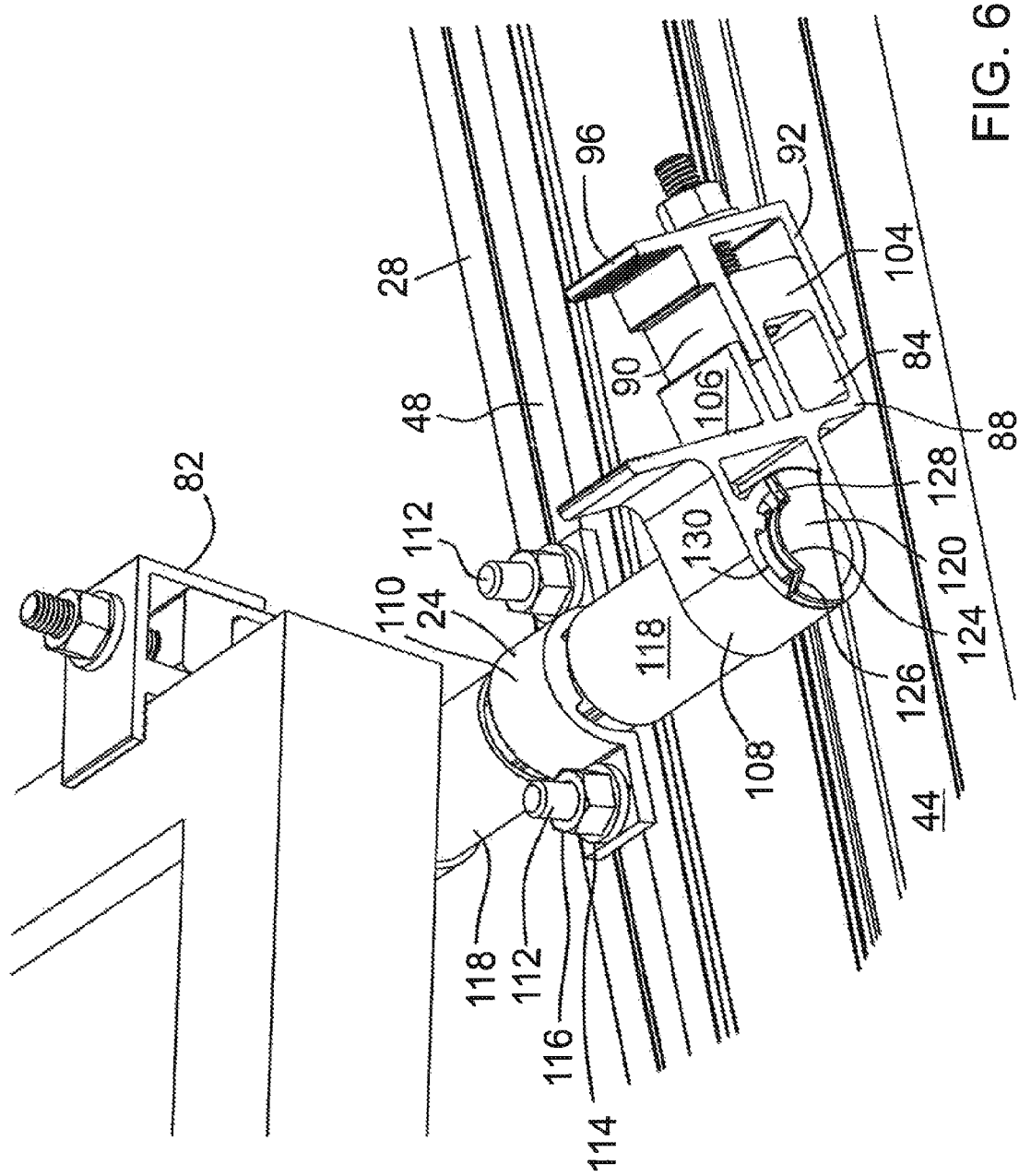
FIG. 6 is a detail view in perspective showing a front clamp assembly mounted on a runner and connected to a front edge of a solar panel.
Figure 8:
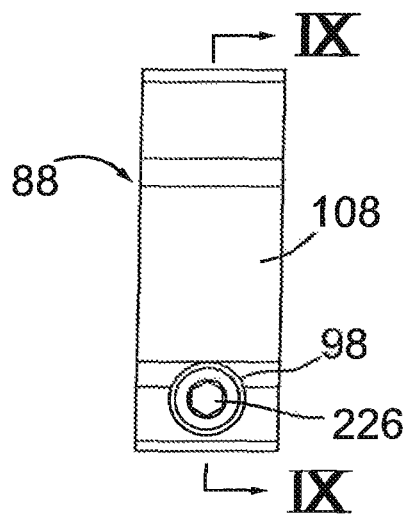
FIG. 8 is a side view of a base clamp member used in the front clamp assembly.
Figure 13:
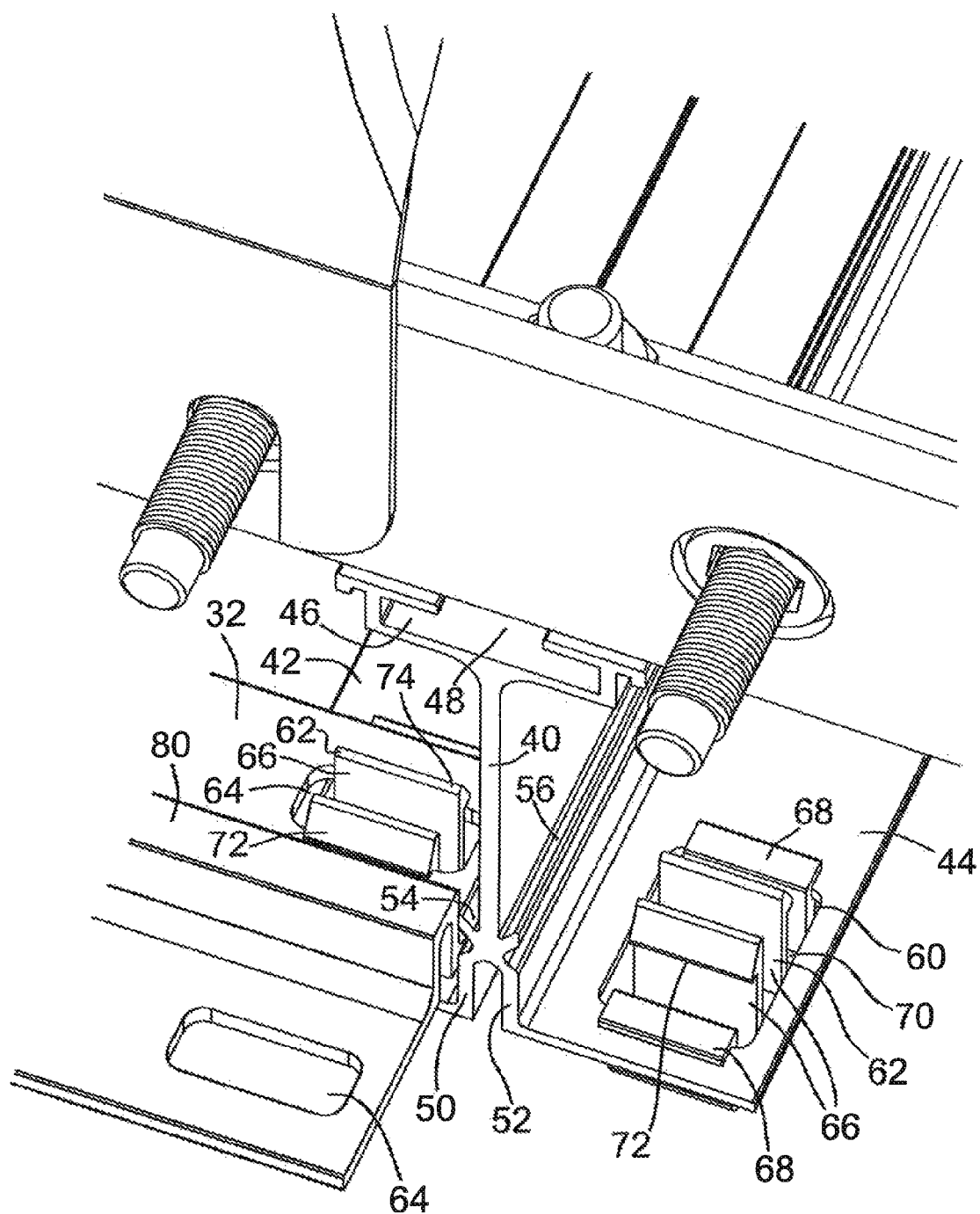
FIG. 13 is a detail view in perspective showing how a cross-member can be connected to a flange of a runner by a first version of a clip.
Figure 14:
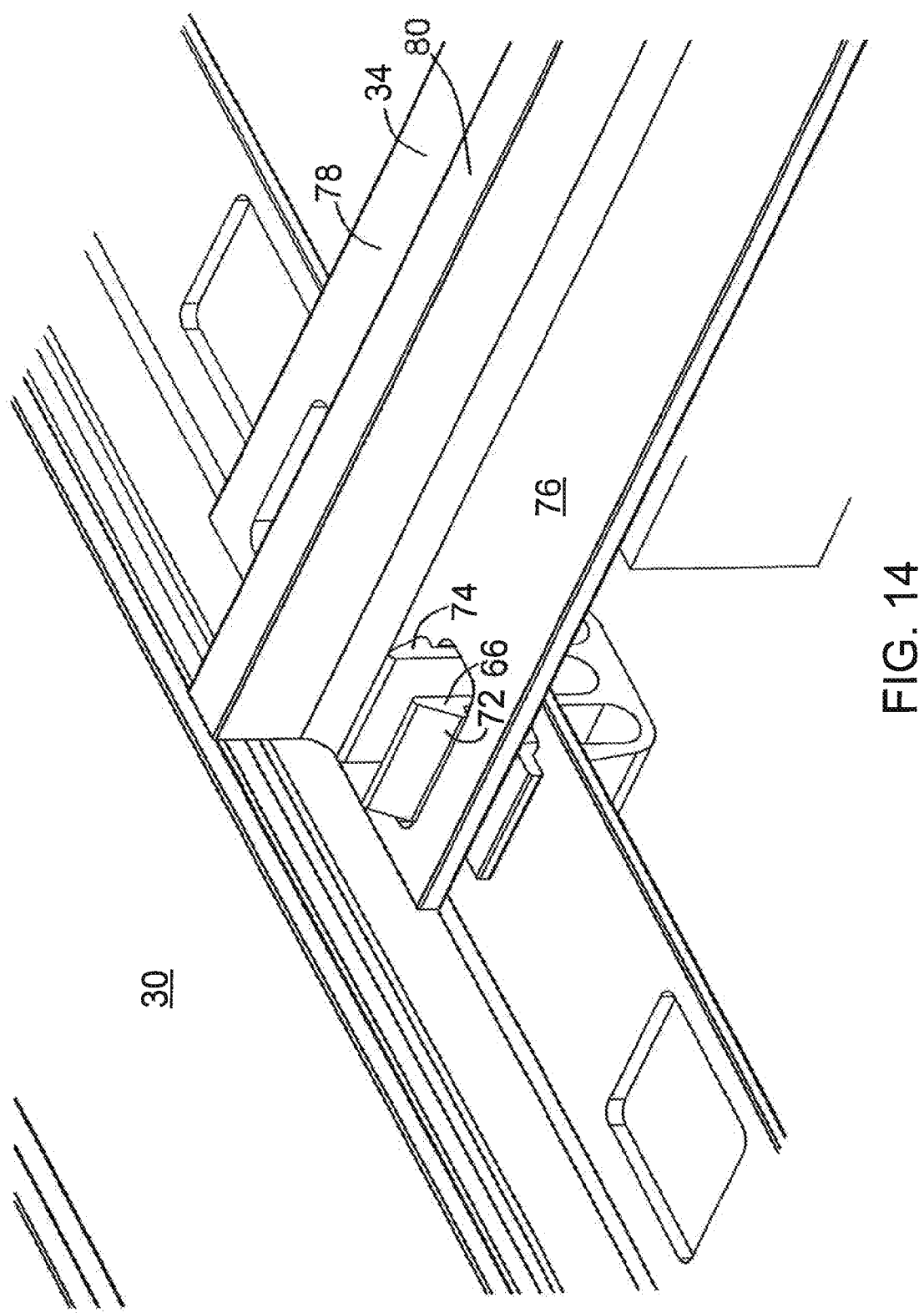
FIG. 14 is another detail view in perspective showing an end of a cross-member connected to one flange of a runner.
Figure 15:
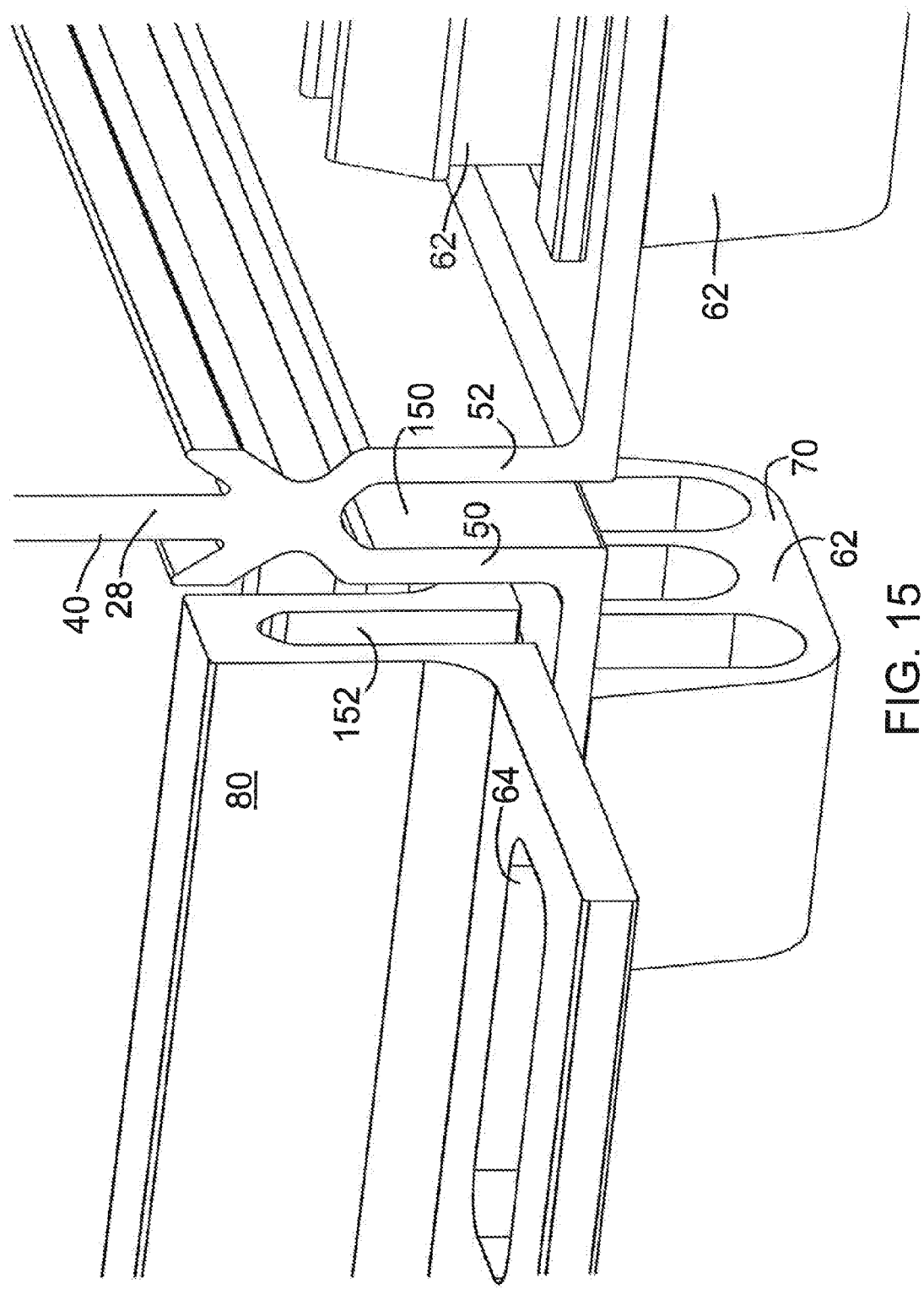
FIG. 15 is a detail view in perspective showing the end profile for a runner and portions of the first version of the clips to attach cross-members.

The cross sectional profile of each runner can be seen clearly from FIGS. 13 to 15. The runner, which can be formed from aluminum or aluminum alloy has a central vertical web 40 and two bottom flanges 42, 44. An upper connecting channel 46 extends along the web 40 and it can have a generally rectangular cross section as shown in FIG. 8 with an elongate slot 48 through which a threaded fastener can extend as shown in FIG. 6. For fastening purposes, the bottom of the vertical web 40 splits into two parallel branches 50, 52 with the bottom flange 42 connected to branch 50 and the flange 44 connected to the branch 52. Also, formed on opposite sides of the web 40 and just above the branches are two V grooves 54, 56 to provide means for attaching a sheet metal wire cap as explained below. Formed at suitable locations along each of the flanges 42, 44 are rectangular openings 60 which accommodate resilient and flexible clip members, a first version of which is indicated by reference 62. Each clip member is used to detachably connect one end of a cross member 32 to its respective runner. Each of the cross members is also formed with a rectangular opening 64 through which the upwardly extending arms 66 of the clip member extend. The first version of each clip member is formed with two generally L-shaped connecting arms 68 on its opposite sides. The horizontal leg of each of these arms engages the top surface of the flange 42 or 44. The bottom edges of the two connecting arms are joined by a bottom section 70 of the clip member and the two parallel arms 66 extend upwardly from this bottom section 70. As will be clear from FIGS. 13 and 14, outwardly extending edge flanges 72, 74 of the arms 66 engage the top surface of one of two side flanges 76, 78 formed on opposite sides of the respective cross-member. These two side flanges are connected to each other by an integral, elongate central channel 80. As explained further hereinafter, the channel 46 on top of each runner allows various mating components to be connected to the top of the runner and allows these components to slide along the runner so that they can be positioned to provide the correct angle for the solar panel.

Figure 7:
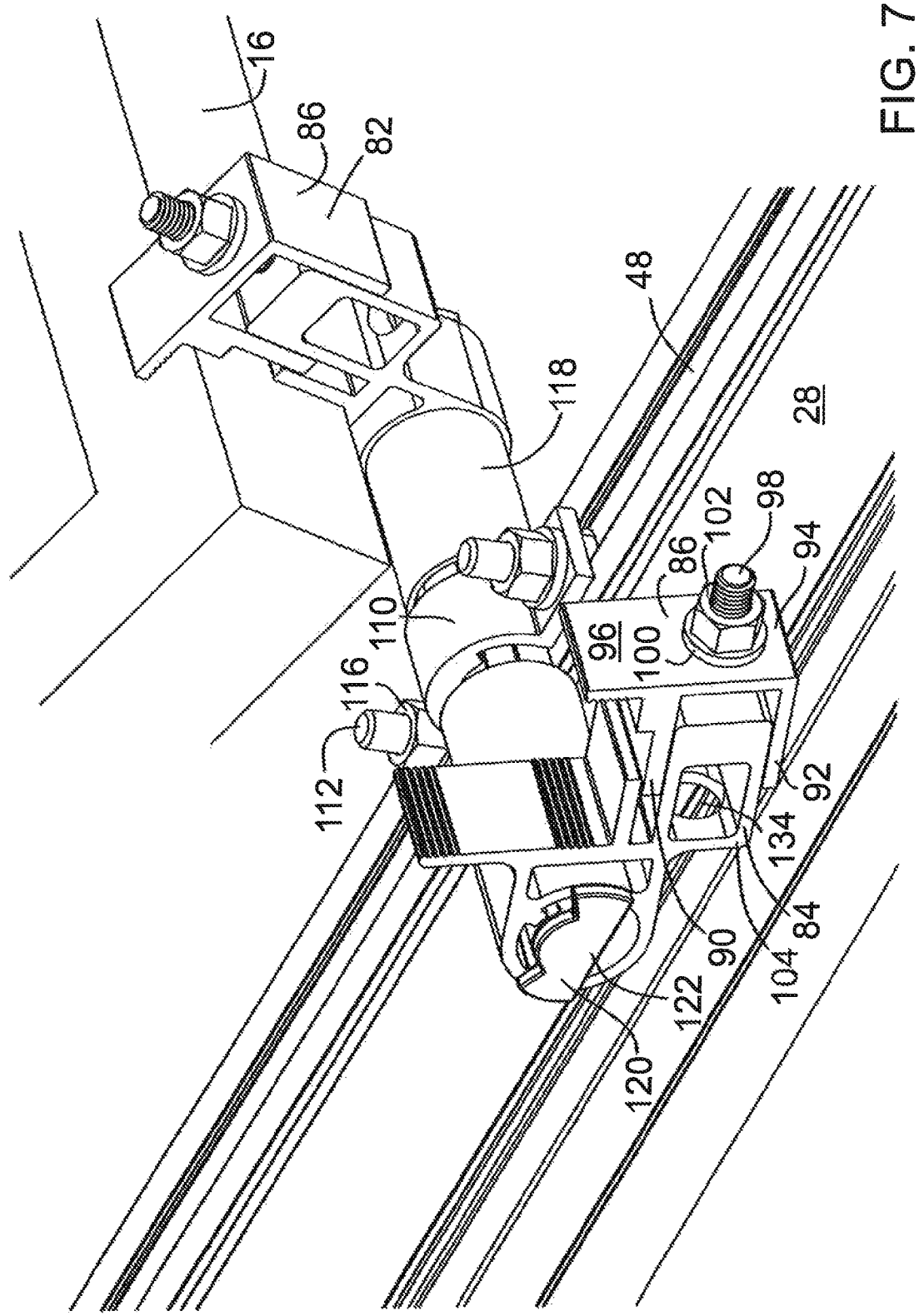
FIG. 7 is another detail view in perspective of the front clamp assembly, this view being taken from above and from the front end.

Turning now to the front clamp assembly best shown in FIGS. 6 and 7, each clamp assembly can include two clamping devices 82, 84, one for each of the solar panels that are being connected to opposite sides of the runner. These two clamping devices are constructed in a similar manner and accordingly only the clamping device 84 will be described in detail herein. The clamping device 82 is shown connected to the bottom frame member 16 of a solar panel. Clamping device 84 is shown unattached but, in use, it would also be attached to the bottom frame member of an adjacent solar panel. The clamping device includes an outer clamp member 86 that is adjustably connected to a base clamp member 88. Clamp member 86 has two parallel, spaced apart legs 90, 92 that are integrally joined by an end plate 94 that includes a projecting end flange 96 that can be formed with gripping teeth or ridges on its inner surface, that is the surface adapted to engage the bottom frame member 16 of a solar panel. A fastener hole is formed in the end plate 94 and through this hole extends a bolt 98 secured in place by a washer 100 and nut 102. The base clamp member has a generally rectangular connecting section 104 having two parallel side walls that define guiding surfaces for the aforementioned legs 90, 92. Close to but spaced apart from one side of the connecting section is an integrally connected guide wall 106 which extends from a pivotal mounting section 108. This mounting section has a round portion into which an end portion of a clevis pin 235 extends. The clevis pin is supported by a clevis pin bracket 110 that is mounted by two threaded fasteners 112 to the top of the runner. These threaded fasteners which can be bolts are secured in place by their respective washers 114 and nuts 116. The rounded bracket extends across the gap or slot formed in the top of the runner. It will be understood that the head of each bolt 112 is either wider than the slot 48 or a washer (not shown) mounted next to the head is wider than the slot 48, thereby preventing passage of the head of the bolt through the slot. By loosening the two nuts 114, it is easy to adjust the position of the bracket and the rest of the front clamping assembly along the top of the runner in either direction. Thin walled cylindrical sleeves 118 can be mounted on the clevis pin in order to correctly position the front clamping assemblies for mounting of their respective solar panels and to prevent them from moving.

Figure 9:
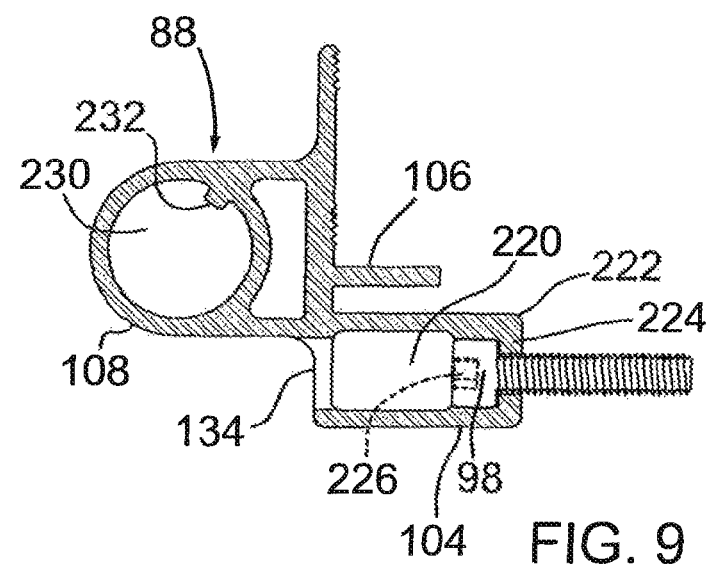
FIG. 9 is a cross-sectional view of the base clamp assembly taken along the line IX-IX of FIG. 8.
Figure 12:
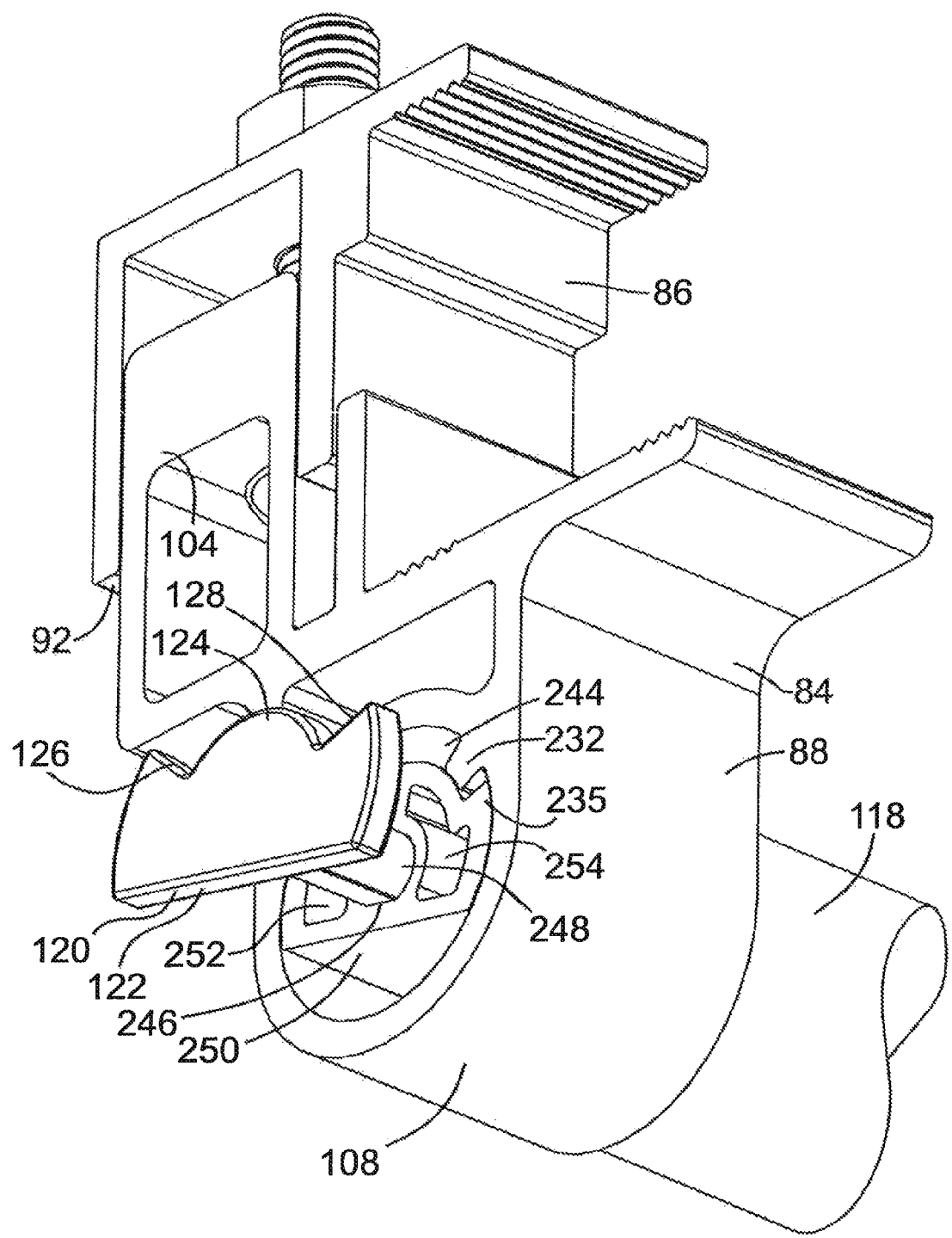
FIG. 12 is a detail view in perspective illustrating how the base clamp member of FIG. 9 is mounted on a clevis pin, this view showing the transverse profile of the clevis pin.

FIGS. 8 and 9 illustrate further details of the base clamp assembly 88. In particular, it will be seen that the rectangular connecting section 104 is formed with a rectangular cavity 220 through which the bolt 98 can be passed. At one end of the cavity is a recess 222 which snuggly accommodates the head 224 of the bolt 98. The head of the bolt is formed with a multi-sided tool receiving end hole 226 into which a turning tool can be inserted for turning or holding the bolt as the nut is applied. FIG. 9 also shows a generally circular passage 230 formed in the mounting section 108. On one side of this passage is an integral stop 232 which can be in the form of a ridge extending the length of the passage. This stop is used to limit pivotable movement of the clamping device on the clevis pin 235, the end of which can be seen in FIG. 12.

Figure 10:
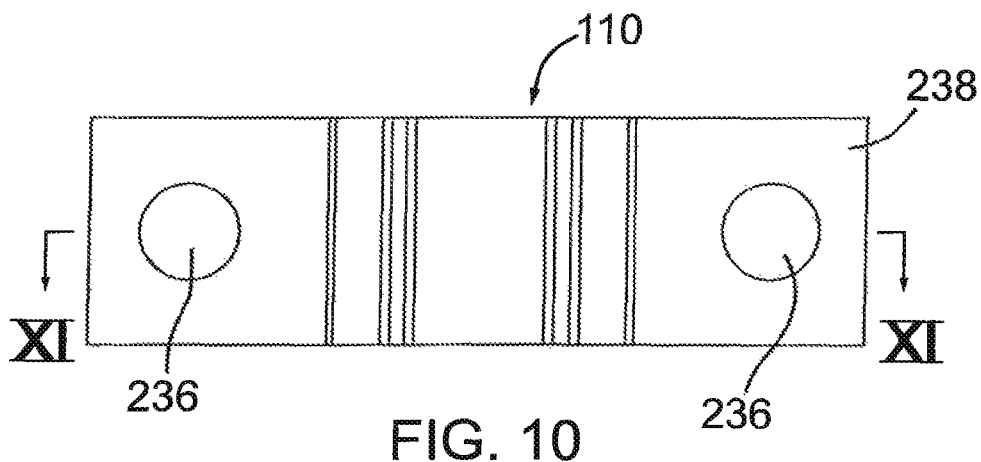
FIG. 10 is a top view of a clevis pin bracket used to connect the front clamp assembly to its runner.
Figure 11:
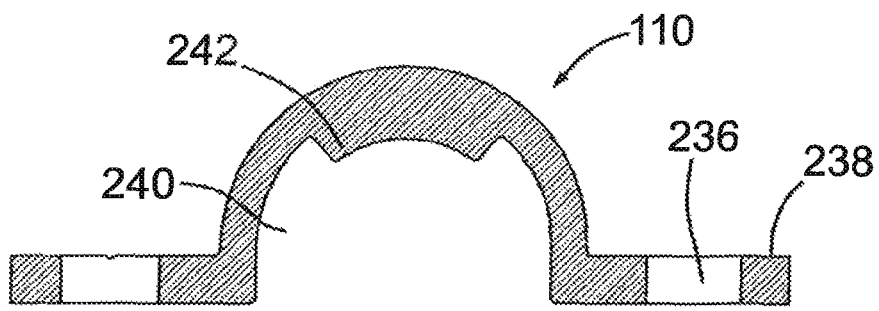
FIG. 11 is a longitudinal cross-section taken along the line XI-XI of FIG. 10.

Further details of the clevis pin bracket 110 can be seen in FIGS. 10 and 11. The aforementioned threaded fasteners 112 extend through holes 236 formed in the two flat end sections 238 of the bracket. The bracket forms an inverted generally U-shaped channel 240 which is shaped to snuggly accommodate the central section of the clevis pin 235. In particular, the top of the inverted channel can be formed with an integral, inwardly extending ridge or elongate projection 242 that can extend the length of the channel. The ridge 242 fits snuggly in a curved, axially-extending recess 244 formed along the top of the clevis pin (see FIG. 12). The engagement between the internal ridge 242 and the sides of the recess 244 effectively prevents any rotation of the clevis pin relative to the bracket and the adjacent runner. The transverse profile of the clevis pin 235 seen in FIG. 12, which shows the pin formed with a central hole 246. Extending snuggly into this hole is a connecting pin 248 which is integrally or otherwise attached to a specially shaped end cap 120, one of which is mounted on each end of the clevis pin. The end cap 120 is held in place by a friction fit between the pin 248 and the side of its hole 246. The clevis pin has a flat bottom surface 250 which rests on top of its respective runner. In addition to the central hole 246, the clevis pin can be formed with two additional and similar passageways 252 and 254 located on opposite sides of the central hole and separated therefrom. The clevis pin can have a uniform cross-section throughout its length. The curved recess 244 of the pin receives a locking mechanism for the adjacent front clamp and the two ends of the recess provide positive stops at the ends of a 90 degree arc through which the recess extends. These two stops are at 90 degrees forward and 0 to 5 degrees back.

The bottom edge 122 of the end cap 120 is straight while its top edge has a rounded central section 124 and two radially extending edges 126, 128 at opposite ends of the central section 124. As indicated, the shape of each end cap 120 and the clevis pin determine the degree of rotation of the respective front clamp assembly. The curved gap recess 244 lies between the recessed top of the clevis pin and the mounting section 108. One or more locking keys (not shown) can be inserted into the recess 244 in order to lock the clamp assembly in a desired position together with the solar panel connected thereto. The preferred front clamp assemblies allow the solar panel module to be held in the upright position (that is 90° to the surface of the roof) and then tilted into its operative position (shown in FIGS. 1 to 4). The clamping and locking arrangement allows for easy installation and maintenance of the solar panels as well as easy access to all fasteners. By locking the clamping assemblies so that they hold the panel upright, the installation of necessary wiring or the performance of maintenance is facilitated. The front clamping assemblies of the invention also help prevent over rotation which is helpful during the shipping and delivery of the solar racking since these clamps will always be in the correct orientation on site. Also because the solar panels can readily be pivoted to the upright position by means of the front clamp assemblies, building owners and landlords will have ready access to the roof even after the solar panel system has been fully installed.

Figure 16:
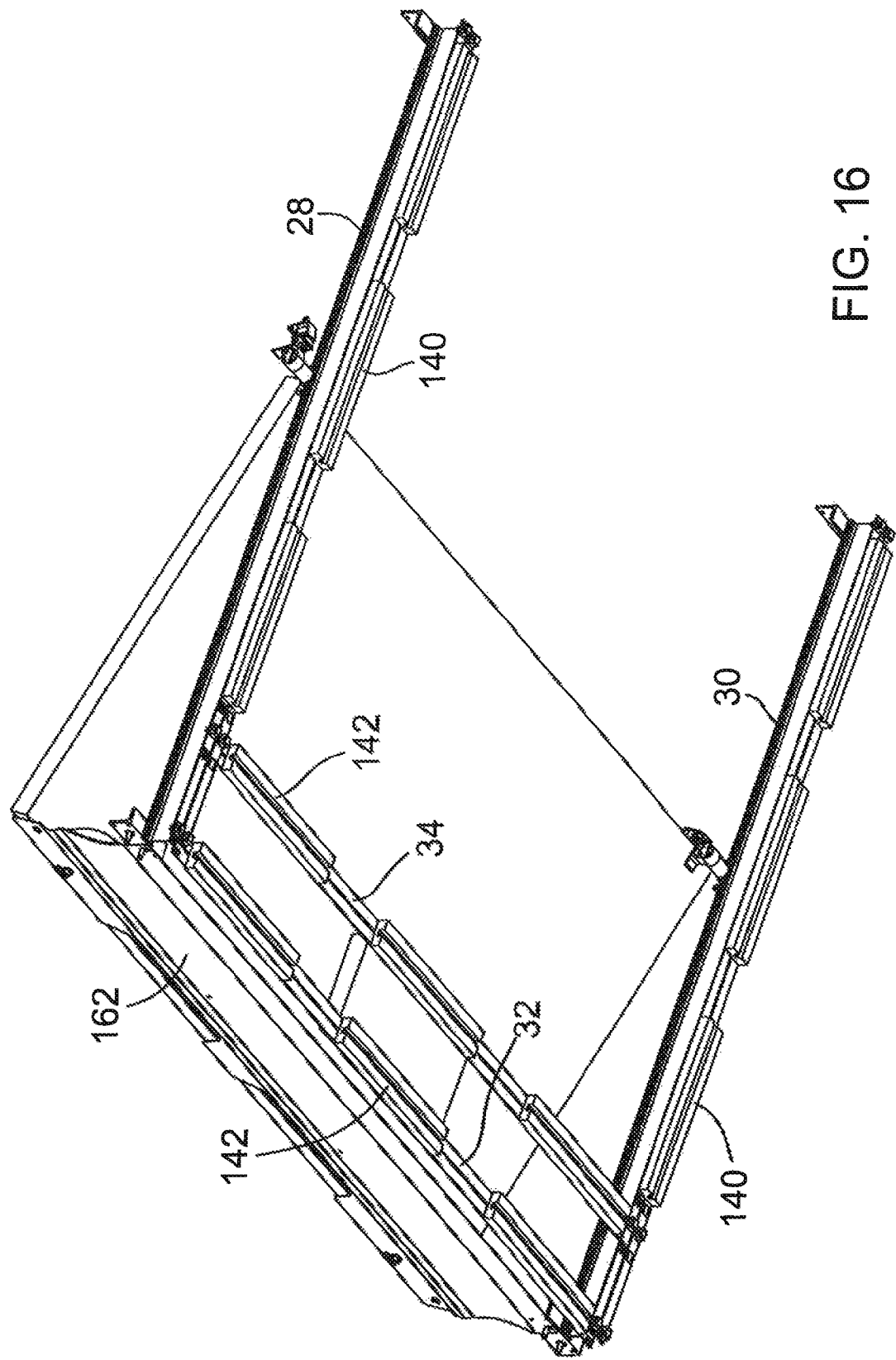
FIG. 16 is a perspective view of the solar racking and panel taken from below and from the rear, this view showing rubber pads mounted on both the runners and the cross-members.
Figure 17:
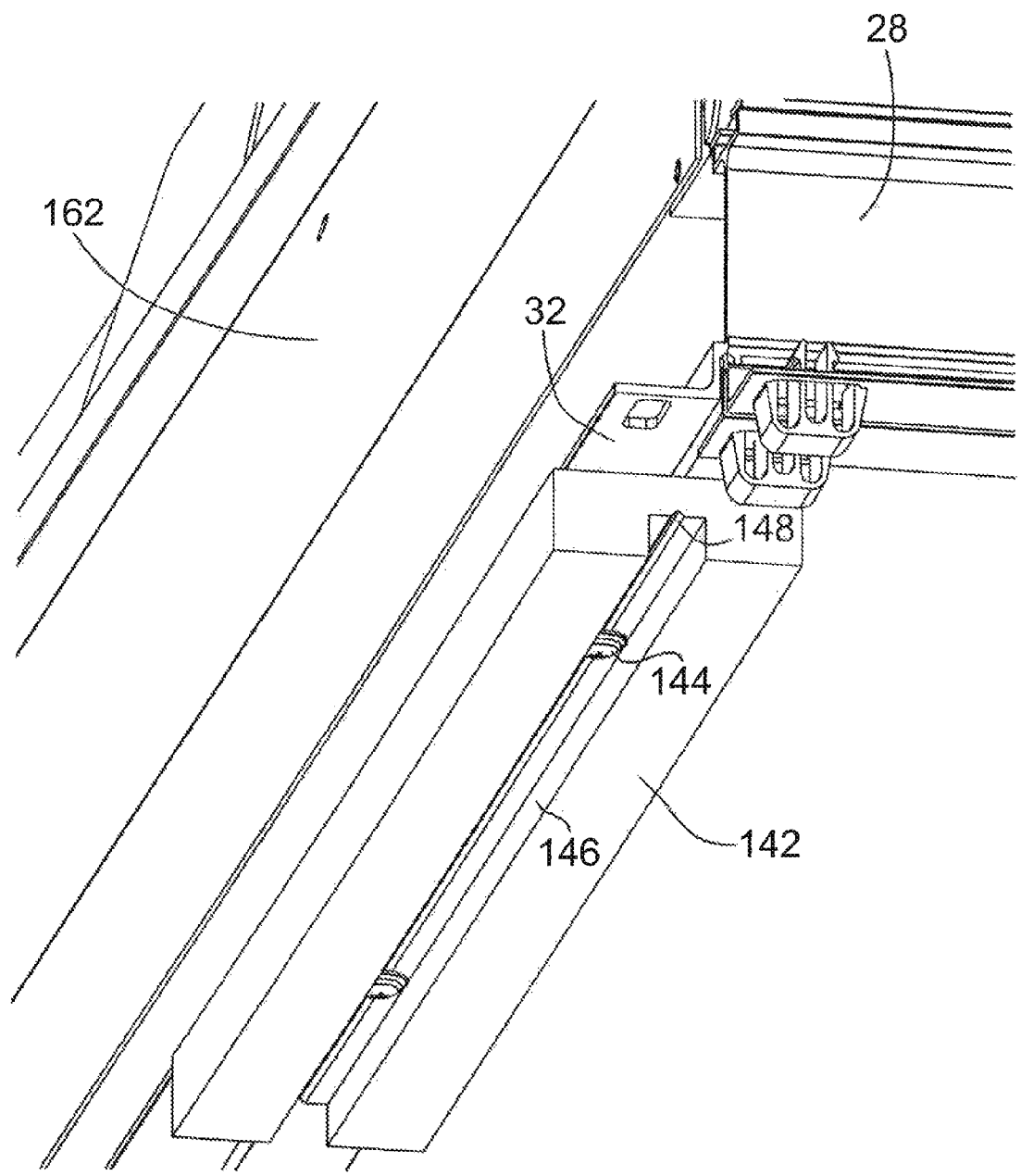
FIG. 17 is a detail view of one of the rubber pads showing how it is fastened in place.

FIGS. 16 and 17 illustrate the use of rubber pads 140 and 142 mounted on the bottom of the racking to support the racking and the solar panel on a roof surface without damaging this surface. As shown in FIG. 16, there are three of the rubber pads 140 distributed along each of the runners 28, 30 and there are three of the pads 142 distributed along each of the cross-members 32, 34. The threaded fasteners 144 used to secure each of these rubber pads to its respective runner or cross-member can be seen in FIG. 17. The heads of these fasteners fit within a central, longitudinal groove 146. Also extending along the bottom of the groove can be an elongate V-groove 148 which helps to center and locate the threaded fasteners. In the case of the fastener used to attach the rubber pad to a runner, the threaded shank of the fastener can readily be threaded into the longitudinal slot 150 formed between the two branches 50, 52 of the runner (see FIG. 15). In the case of the fasteners for the pads that are attached to the cross-member, the threaded shanks of these fasteners can extend into the longitudinal slot 152 formed by the central channel 80.

Figure 18:
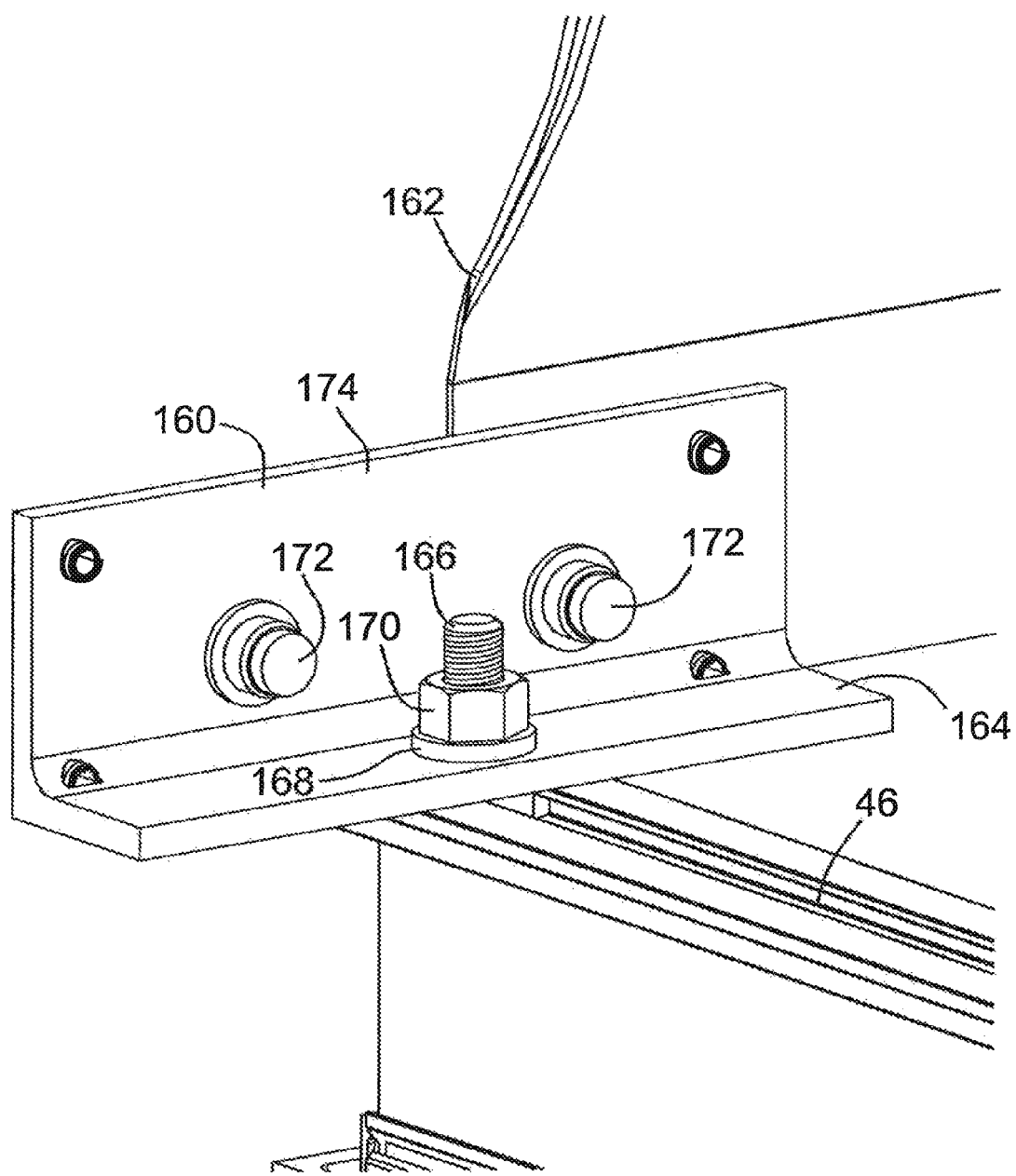
FIG. 18 is a detail view in perspective showing an end support plate mounted on the end of a runner and connected to a corner of a wind deflector.
Figure 19:
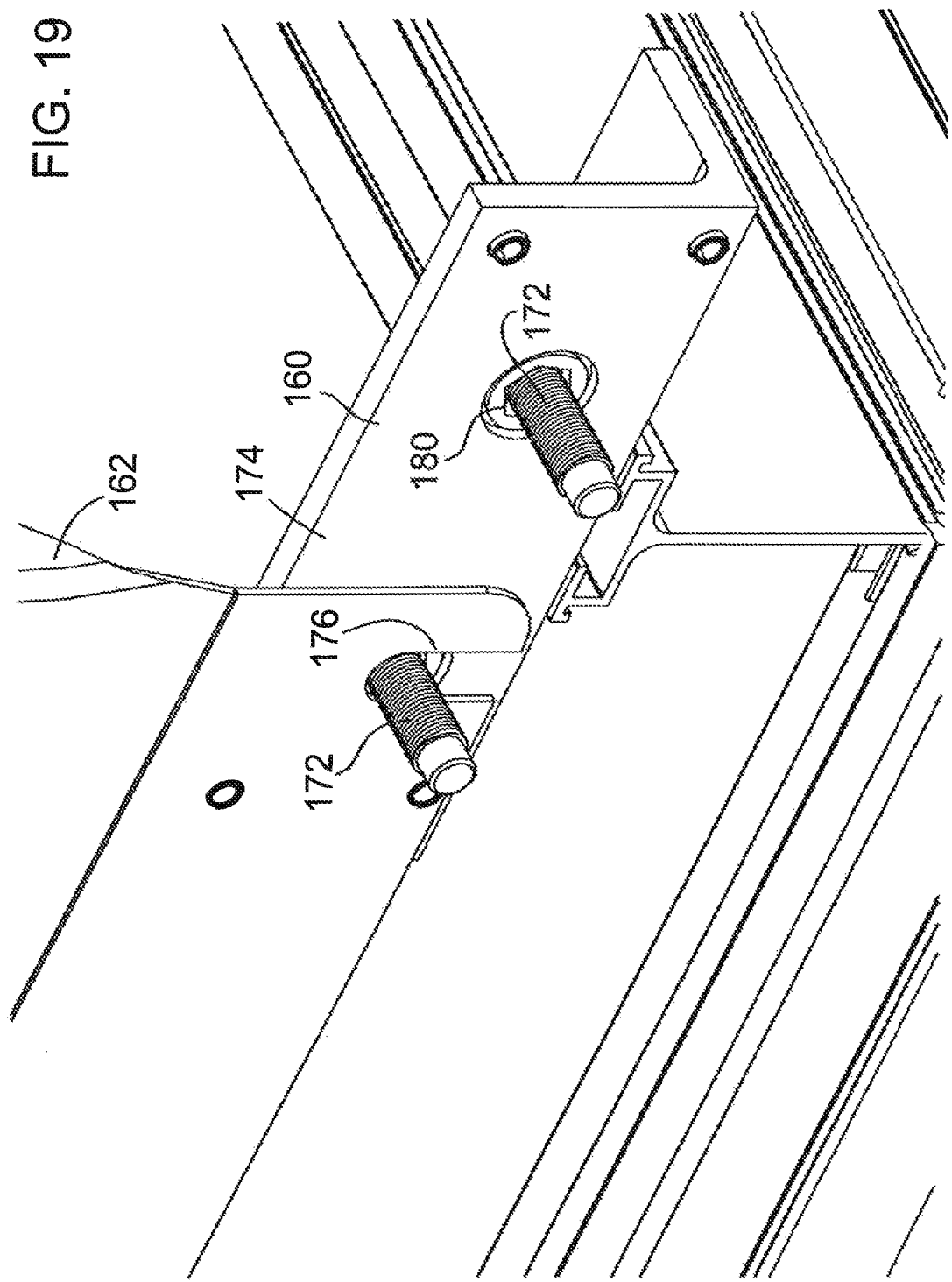
FIG. 19 is another detail view but showing the end connecting plate from the rear side.
Figure 20:
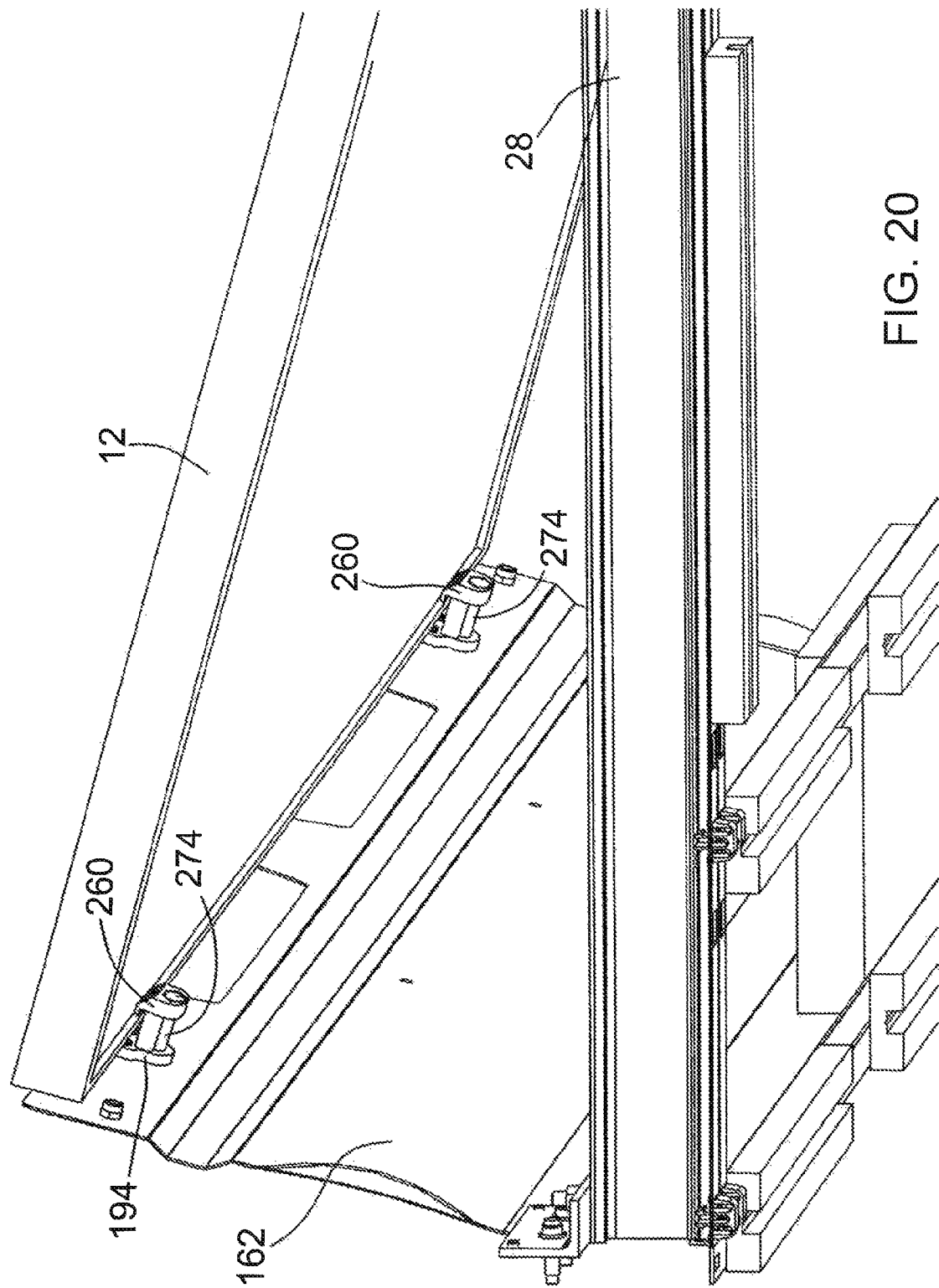
FIG. 20 is a perspective view showing the solar panel connected to the wind deflector at its top by J-clamp assemblies.
Figure 21:
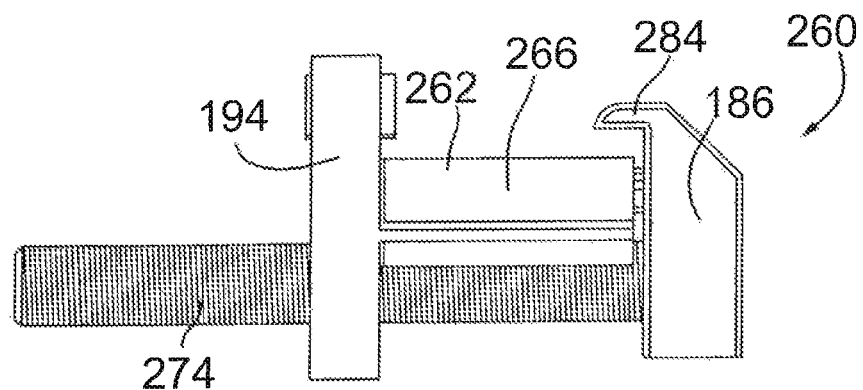
FIG. 21 is a side elevation of a rear clamp assembly for connecting a top frame of the solar panel to the wind deflector.
Figure 22:
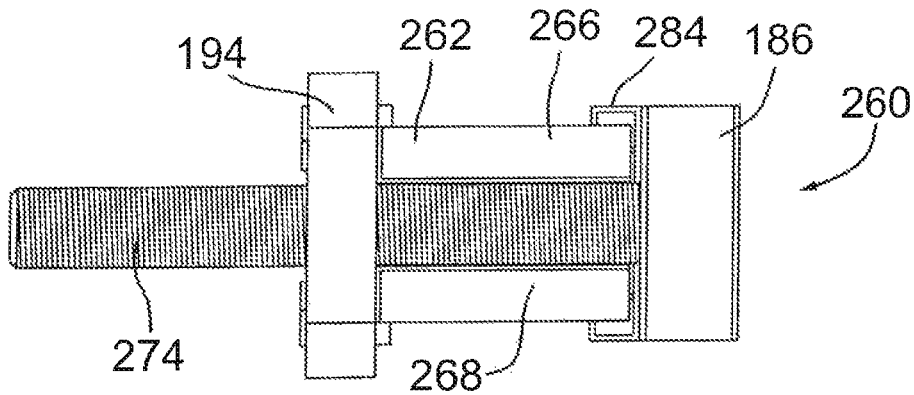
FIG. 22 is a bottom view of the rear clamp assembly of FIG. 21.
Figure 23:
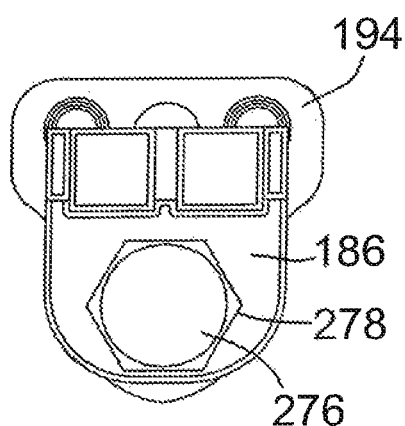
FIG. 23 is a front end view of the rear clamp assembly.
Figure 24:
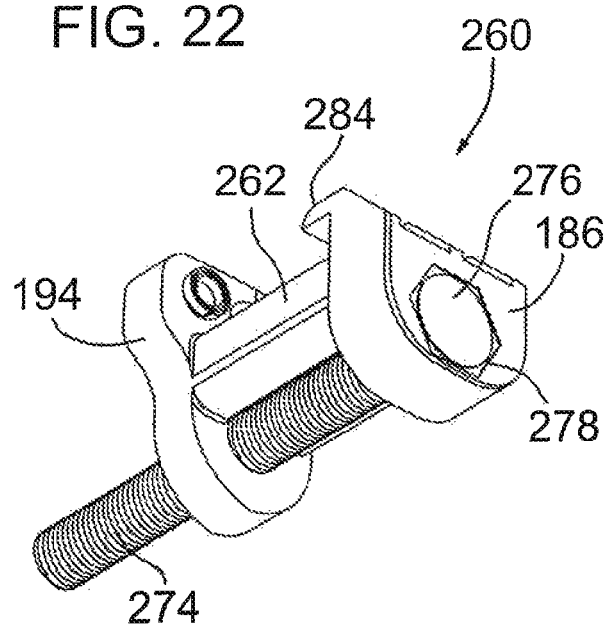
FIG. 24 is a perspective view of the rear clamp assembly taken from below and from the front end.
Figure 25:
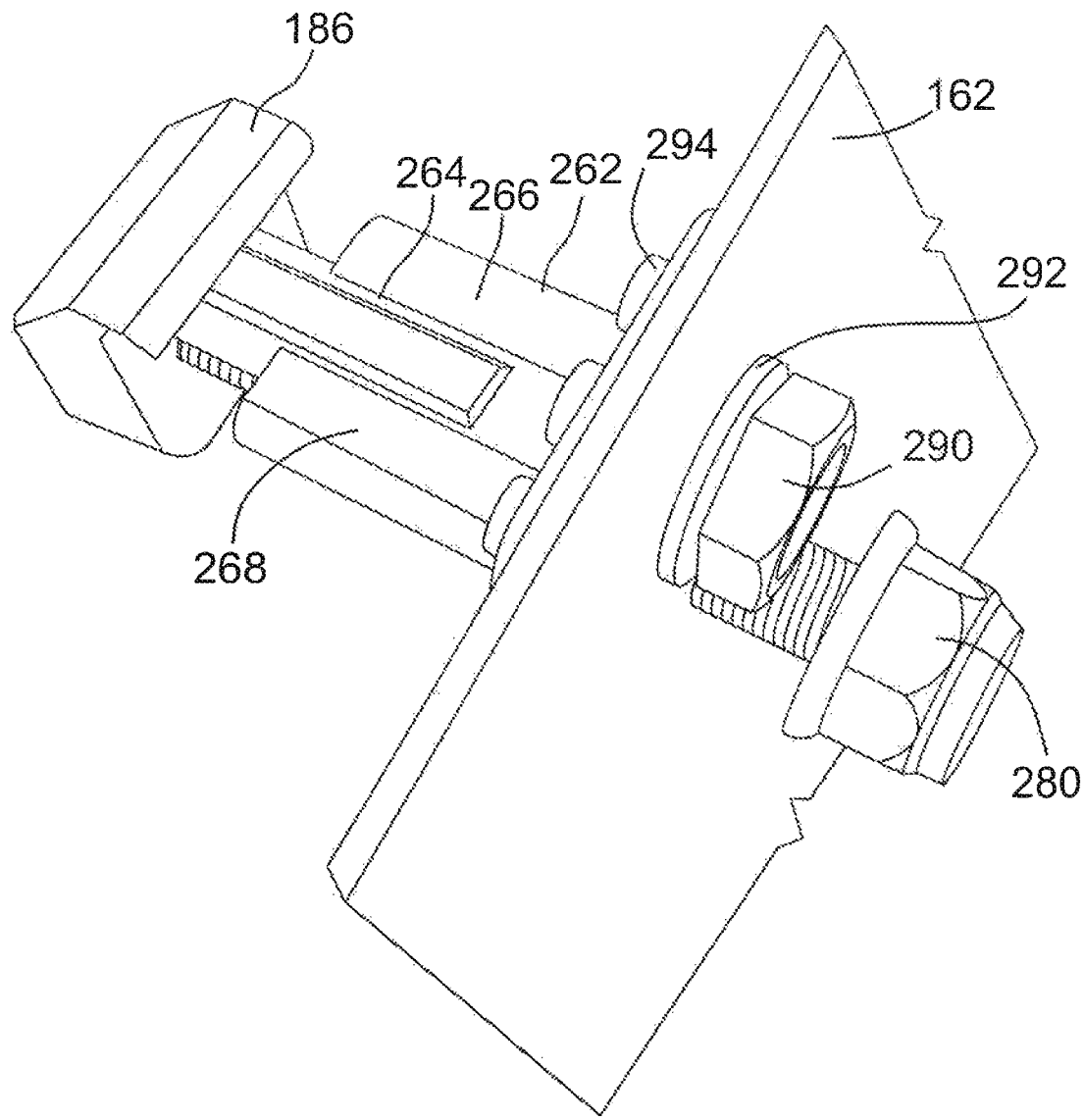
FIG. 25 is a detail view showing how the rear clamp assembly is connected to the wind deflector, this view being taken from above.
Figure 26:
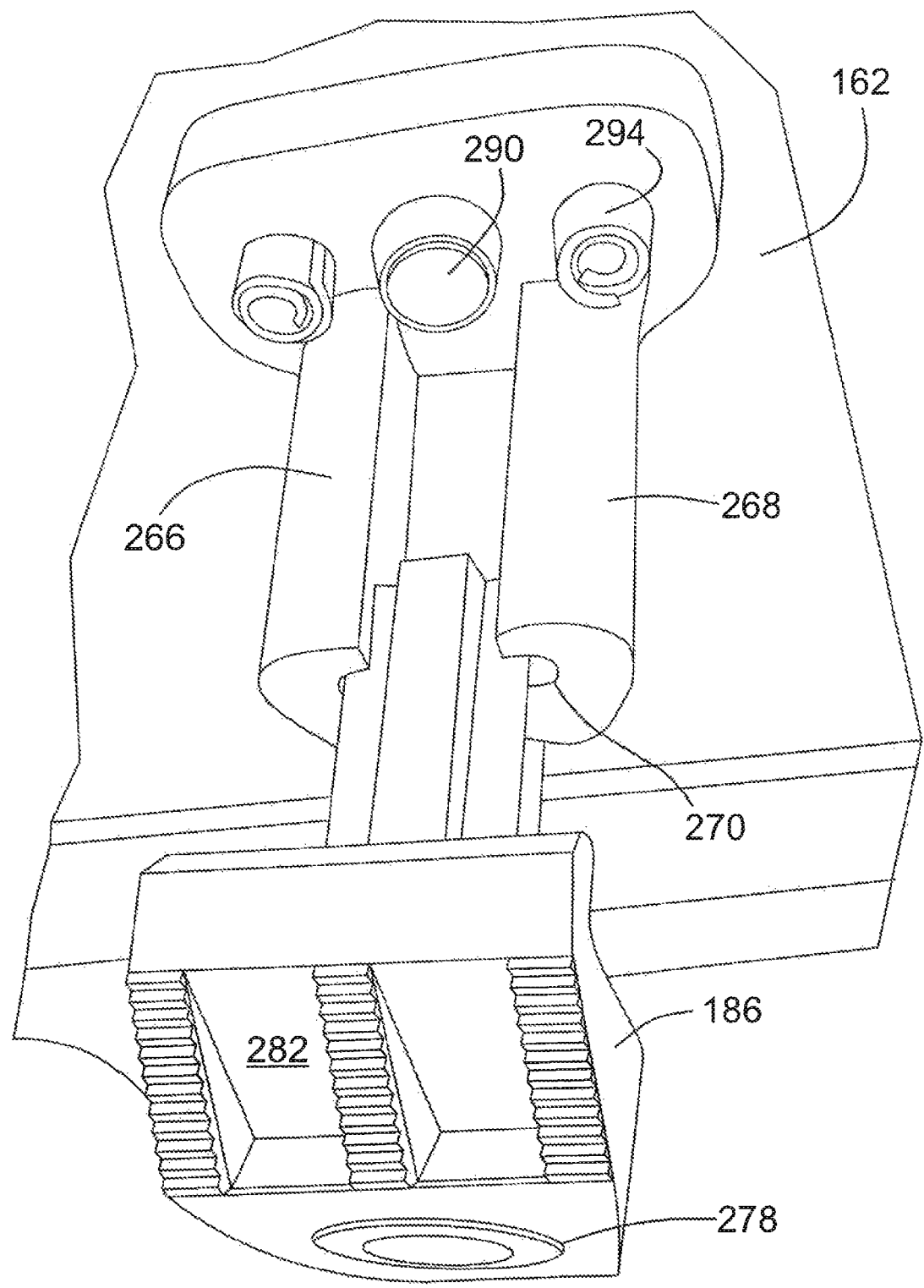
FIG. 26 is another detail view of the rear clamp assembly showing the manner in which the J-clamp is slidably connected to the back plate.

FIGS. 18 and 19 illustrate the construction of an end plate 160 in the form of an angle member which is used to connect a wind deflector 162 to the end of each runner. The bottom or horizontal leg 164 of the end plate has a central hole through which a single fastener 166 extends. It will be understood that the head of this fastener or bolt 166 is slidably secured in the channel 46 in the top of the runner. The bolt is secured in place by means of a washer 168 and nut 170 so that the end plate extends perpendicular to the length of its respective runner. Two threaded fasteners 172 extend through two holes formed in the vertical leg 174. Each of these fasteners is used to secure one bottom corner of its respective wind deflector which can be secured to the fastener by means of a nut (not shown). In the exemplary wind deflector shown, its bottom edge is formed with a vertical slot 176 through which the fastener 172 extends. The exemplary holes in the vertical leg 174 are six sided as indicated at 180. The fasteners have a six sided portion adjacent the round head which fits into the multiple-sided opening 180, thereby preventing the threaded fastener from rotating in the opening. This arrangement facilitates attachment of a nut onto the fastener. Because of the slot 176, it is simply necessary to loosen the nut and not completely remove same in order to detach the wind deflector from the end plate.

Another inventive feature of the present solar racking is the manner in which the top frame member 18 of the solar panel is connected to the top of the wind deflector 162. The use of and construction of rear clamp assemblies 260 are illustrated in FIGS. 20 to 26. Once the solar module panel has been clamped along its bottom edge by the two front clamp assemblies, it is rotated back and rests on the two rear clamp assemblies. The two clamps are able to lock the solar module in place against a back plate 194 of each rear clamp. A tongue and groove feature of the clamp described below prevents rotation between a J-clamp member or connecting block 186 and the back plate 194. The two rear clamp assemblies engage the solar panel where it is strongest along the profile of the top frame member 18, thus providing a very rigid connection.

FIGS. 21 to 24 illustrate details of each rear clamp assembly 260. The two main components of each clamp assembly are the aforementioned back plate 194 and the J-clamp member or connecting block 186. Formed on the back plate is a forwardly extending guideway 262 defining a guide path 264. In an exemplary clamp assembly 260, the guideway is formed by two separate guide members 266, 268 which are parallel and spaced apart. Formed in each guide member is an elongate, inwardly directed groove 270 visible in FIG. 26. The two grooves 270 define the guide path 264 along which the J-clamp member moves in a linear manner. The illustrated, exemplary J-clamp member 186 is adjustably connected to the back plate by means of a threaded fastening device which includes a bolt 274 having a head 276 which fits snuggly in a multi-sided recess 278 formed in the J-clamp member. Threaded onto the bolt is a flanged nut 280 shown in FIG. 25. The bolt extends through a hole formed near an upper corner of the wind deflector 162.

The illustrated J-clamp member is formed with two similar rectangular recesses 282 on its upper half. Also, this clamp member has a top flange 284 which extends towards the back plate and which is used to grip an edge of the upper or top frame of the solar panel. The back plate can be secured at all times to the wind deflector by means of a single, short bolt 290 which extends through a washer 292. A central hole formed in the back plate is threaded to engage and hold the threads of this bolt. Two cylindrical pins can be mounted in the back plate on opposite sides of the bolt 290, these being indicated at 294. The round ends of these pins engage the adjacent side of the upper frame member of the solar panel creating a firm grip.

Sheet Metal Wire Cap

Figure 27:
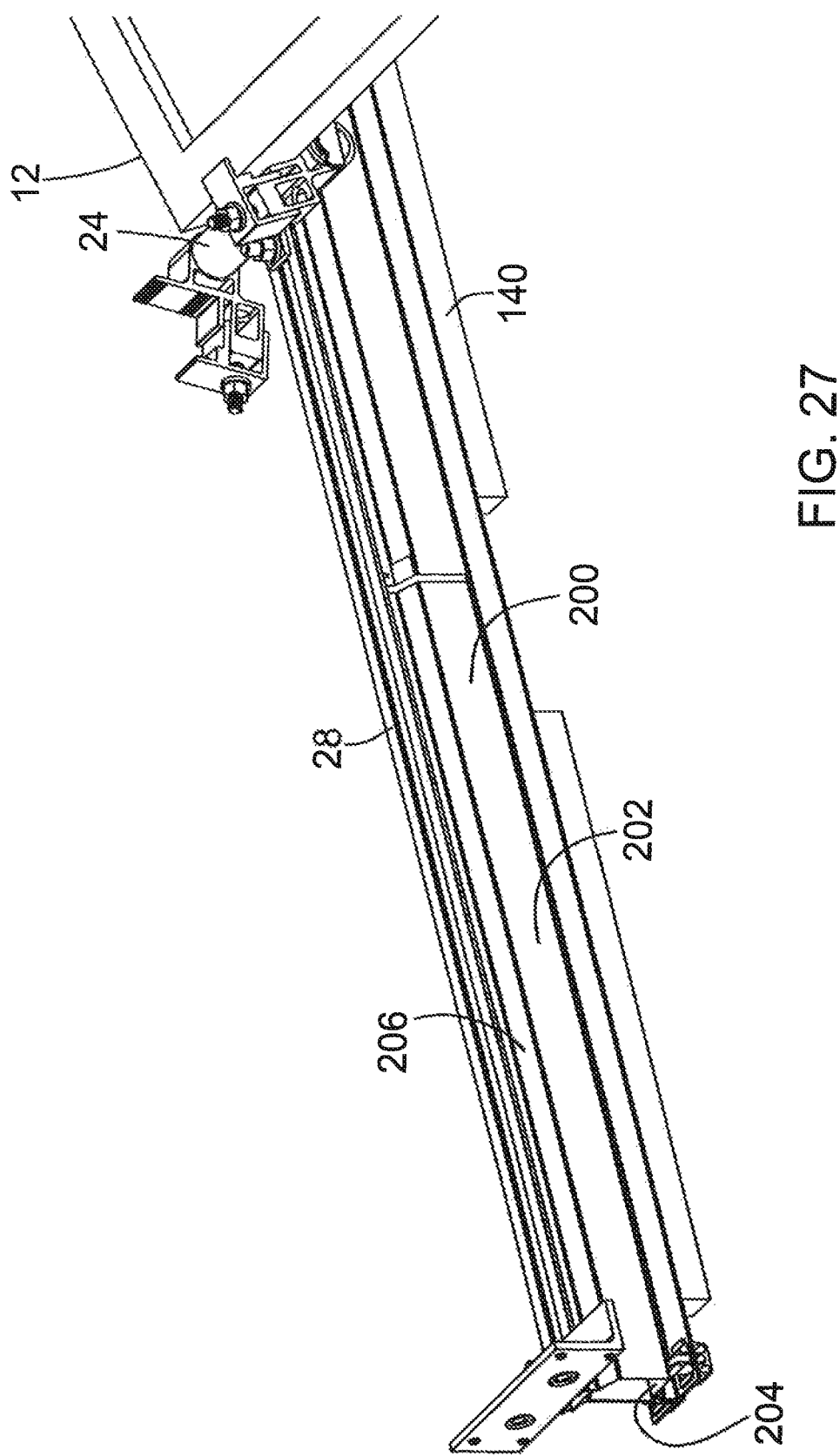
FIG. 27 is a perspective view taken from above and from the front and showing an elongate wire cap extending along one runner.
Figure 28:
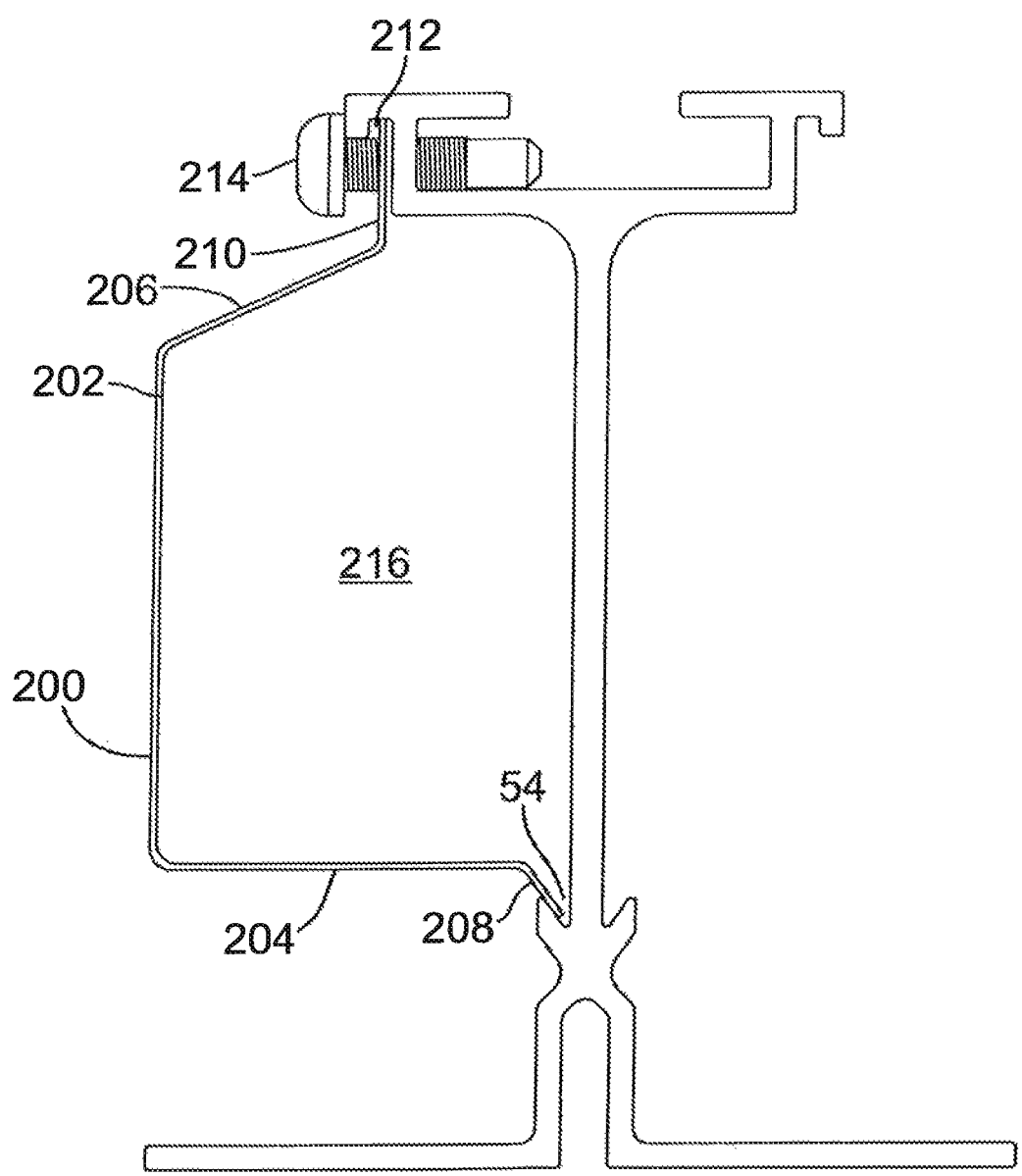
FIG. 28 is a detail elevation view showing the manner in which the wire cap is mounted on one side of the runner.

An exemplary, elongate wire cap 200 can be mounted on the inner side of each runner as shown in FIG. 27. The profile of the wire cap 200 can be seen in FIG. 28. The exemplary cap has a vertical, central section 202, a horizontal bottom section 204 and a sloping top section 206. The bottom section is integrally connected to a sloping edge flange 208 and this edge flange sits in one of the V-grooves formed on the side of the runner. Extending vertically upwardly from the top section 206 is a top flange 210, the upper edge of which can fit into a downwardly opening groove 212 of the runner. Once the wire cap is mounted along its top and bottom edges, it can be further secured in place by screws 214, which extend through holes formed in the top flange 210 and in the top section of the runner. An enclosed chamber 216 is formed between the wire cap and the runner and electrical wires, control wires etc. can extend through the length of this chamber to and from the solar panel.

Second Version of the Clip Member

Figures 29, 30:
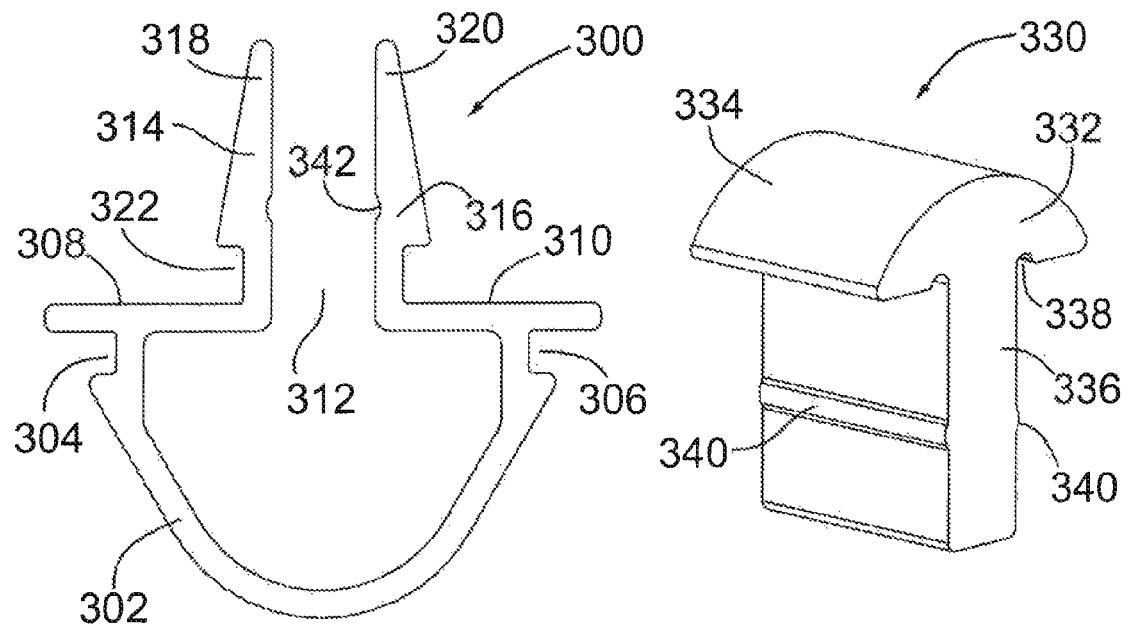
FIG. 29 is a side view of a second version of clip usable to attach a cross-member to a runner.
FIG. 30 is a perspective view of a center pin that can be used to secure in place the clip of FIG. 29.
Figure 31:
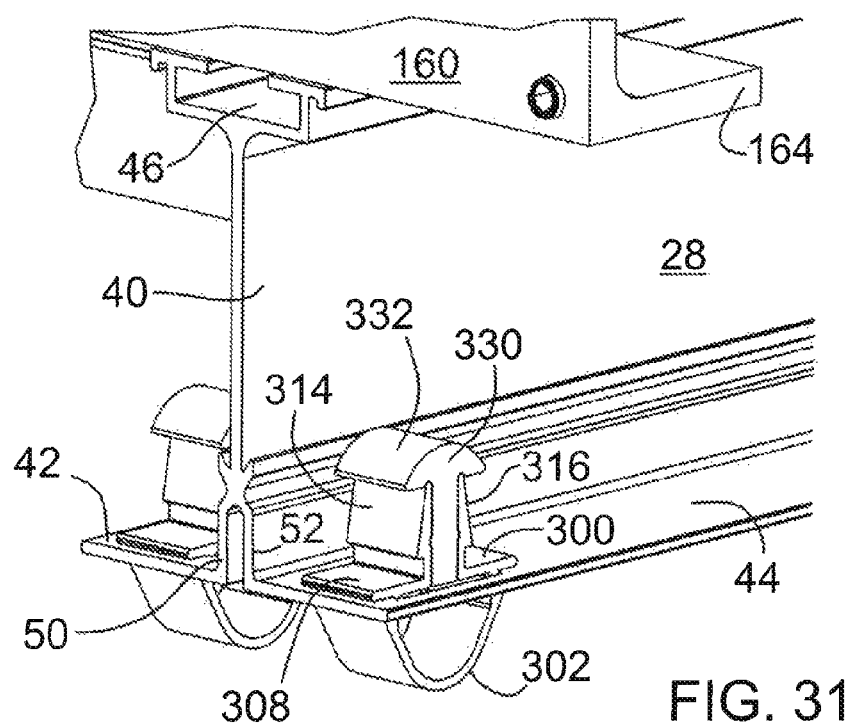
FIG. 31 is a detail view in perspective showing two of the clips mounted in bottom flanges of a runner, this view being taken from above and from one end of the runner.
Figure 32:
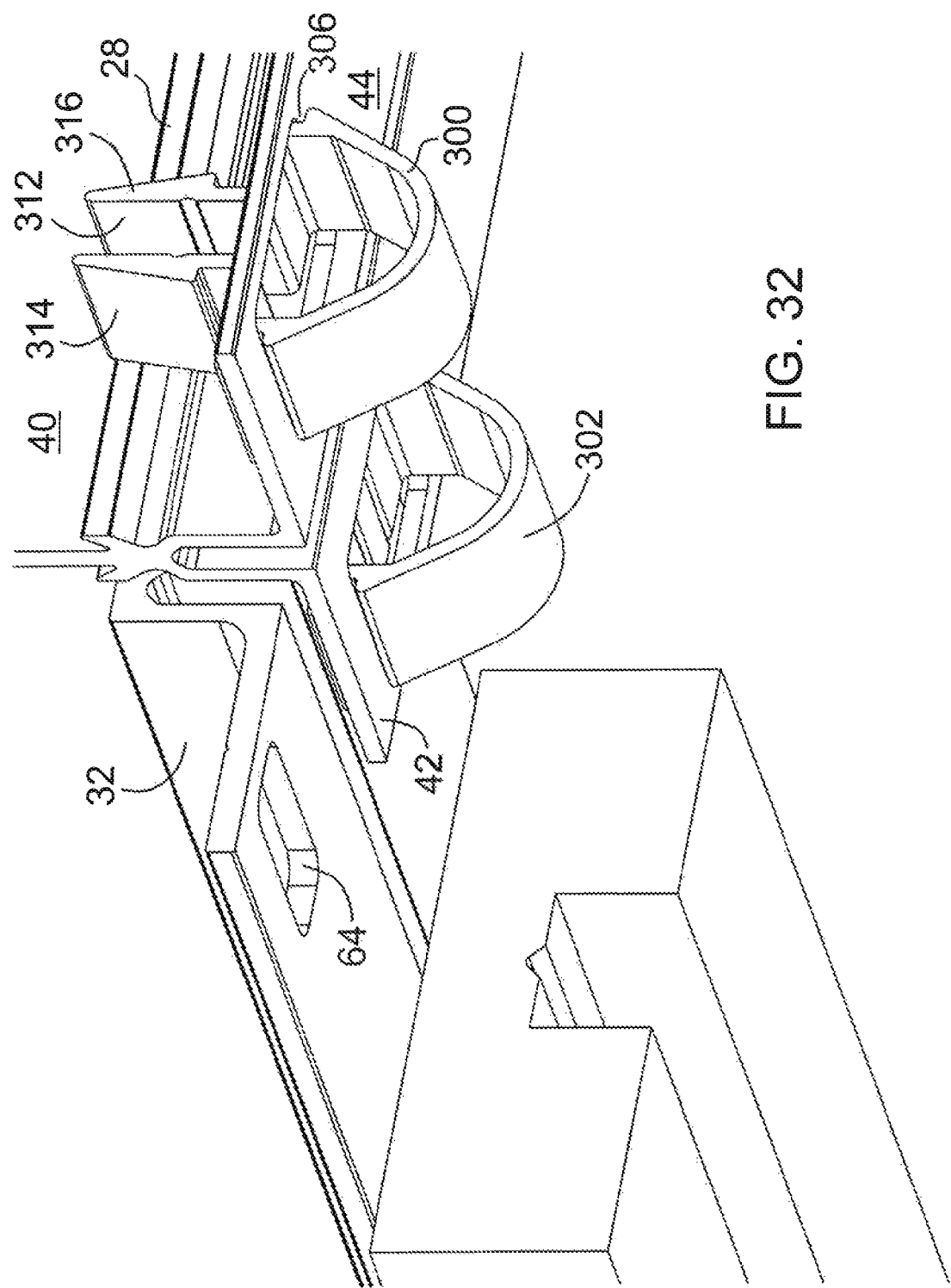
FIG. 32 is another detail view in perspective showing a cross-member connected by the clip of FIG. 29 to the end of the runner.

FIGS. 29, 31, and 32 illustrate a second version of a clip member indicated by reference 300 which can be used to detachably connect one end of a runner such as the runner 28 to a cross member such as a cross member 32, an end of which can be seen in FIG. 32. The clip member 300 includes an arcuate lower section 302, two connecting grooves 304, 306 located on opposite sides of the clip member and two horizontal and aligned top sections 308 and 310 separated by a central gap at 312. Extending upwardly from each of the top sections along their inner edges are connecting arms 314 and 316. Each of these arms has an enlarged, upwardly tapering head section, 318, 320. Located below each head section is another connecting groove 322, the two grooves engaging opposite edges of a hole formed in the cross-member 32. One of these rectangular holes is indicated at 64 in FIG. 32. The clip member can be made of aluminum and is both flexible and resilient to permit attachment to both the end of a runner and to the end of a cross-member. As shown in FIG. 31, when the clip member is mounted on the flange 42 or 44 of the runner, the two top sections 308, 310 are positioned on top of the flange and the two grooves 304 and 306 receive opposite edge sections of the rectangular hole formed in the flange. In this way, the clip member is held firmly in place on the runner for attachment of the end of the cross member.

An optional center pin 330 can be used to secure the clip member 300 in place after the clip member is attached to both the end of the runner and to the cross member. The pin can be formed with a head section 332 which can be formed with a rounded convex top surface 334. Extending downwardly from the centre of the head section is a connecting stem or shank 336. The length of the shank can be similar to the length of the connecting arms 314, 316 or slightly longer. Once the clip member 300 is in place so as to connect the ends of the runner and the cross-member, the shank 336 can be inserted between the two connecting arms as shown in FIG. 31, thereby holding these arms apart and in position. The rounded tops of the arms can rest in elongate undercuts 338 formed in the bottom of the head section adjacent the shank. Also in the exemplary version shown, opposite sides of the shank are formed with rounded, horizontal ridges 340 which engage corresponding, cooperating grooves 342 formed on the inner surfaces of the connecting arms. The engagement between the two ridges and their respective grooves helps prevent the center pin from becoming inadvertently disengaged from the clip member. It will be understood that the use of the center pin 330 increases the strength of the connection provided by the clip member between the runner and the cross-member by preventing the clip member from collapsing.

Although the present invention has been illustrated and described as embodied in exemplary embodiments, e.g. embodiments having particular utility in the support of solar panels, it should be understood that the present invention is not limited to the details shown herein, as it will be understood that various omissions, modifications, substitutions and changes in the forms and details of the disclosed racking systems and clamps and other components and their operation may be made by those skilled in the art without departing in any way from the scope of the present invention. For example, those of original skill in the art will readily adapt the present disclosure for various other applications without departing from the scope of the present invention.

What is claimed is:

1. A supporting rack for a solar panel comprising:
    a framework adapted for mounting on a support surface, said framework including two elongate runners that are spaced-apart and parallel to each other, and an elongate cross-member extending between and connecting the two runners; and
    means for detachably and adjustably mounting said solar panel on top of said framework so that said solar panel in use extends at an acute angle to a plane defined by the two runners and with a direction of inclination generally parallel to the runners, said mounting means including two front clamp assemblies each mountable on a respective one of said runners and clamped to a front edge of the solar panel, each front clamp assembly including a clamping mechanism for clamping said front edge in a detachable manner and a pivot pin connection for pivotally connecting said clamping mechanism to a respective one of said runners,
    wherein, after installation of the supporting rack on said support surface, said solar panel can be pivoted from said acute angle to the plane of the runners, which can be an operating position for generating electrical power from sun radiation, to a greater angle to said plane for facilitating maintenance, repair or inspection of one or more of said solar panel, said support racking and said support surface,
    wherein said clamping mechanism includes an outer clamping member, a separate base clamping member pivotally mounted on its respective pivot pin connection, and a threaded fastener device for detachably connecting the outer and base clamping members, wherein each clamping mechanism can be clamped to said front edge of the solar panel by tightening the threaded fastener device and thereby pulling the outer clamping member towards the base clamping member, and
    wherein said base clamping member has a hollow round portion that extends around its respective pivot pin connection, and a locking tab formed in said hollow round portion and extending into an exterior recess formed on said pivot pin connection, whereby engagement between said locking tab and either of two sides of said exterior recess prevents over rotation of the respective clamping mechanism.

2. The supporting rack according to claim 1, including a second clamping mechanism for mounting another solar panel pivotally and respectively mounted on each pivot pin connection.

3. The supporting rack according to claim 1, wherein each pivot pin connection is mounted on its respective runner so that the position of the pivot pin connection is adjustable in the lengthwise direction of its respective runner.

4. The supporting rack according to claim 1, wherein said greater angle is 90 degrees to said plane so that said solar panel can be mounted and held in said two front clamp assemblies while the solar panel is extending perpendicularly to top surfaces of the two runners.

5. The supporting rack according to claim 1, wherein each runner is integrally formed with a longitudinal connecting channel on a top of the runner and each pivot pin connection includes a pivot pin and a bracket connector securing said pivot pin to the top of its runner by means of said connecting channel.

6. The supporting rack according to claim 1, further comprising two flexible, resilient clips each attaching a respective one of two opposite ends of said cross-member to a respective one of the runners.

7. A supporting rack for a solar panel comprising:
    two separate elongate runners adapted for mounting on a fixed support surface so that said runners are spaced apart from and parallel to each other, each runner being formed with a longitudinal connecting channel extending along a top of the runner;
    at least one separate, elongate frame member for connecting the two runners;
    and two panel clamping assemblies each pivotally mounted on a respective one of said two runners and each including a connecting device engageable with sides of the respective connecting channel to secure the panel clamping assembly to the top of its runner,
    wherein each connecting device can be disengaged from the sides of its respective connecting channel to allow the connecting device and the rest of its clamping assembly to be moved in a lengthwise direction along their runner to a desired position for supporting the solar panel at a desired degree of inclination relative to the two runners, and
    wherein each of said clamping assemblies including a base clamping member pivotally mounted on a pivot pin connection, the base clamping members having a hollow round portion that extends around its respective pivot pin connection, and a locking tab formed in said hollow round portion and extending into an exterior recess formed on said pivot pin connection, whereby engagement between said locking tab and either of two sides of said exterior recess prevents over rotation of the respective clamping assembly.

8. The supporting rack according to claim 7, further comprising rubber pads secured to a bottom of each runner in order to protect said support surface.

9. The supporting rack according to claim 7, wherein each runner is integrally formed with upper and lower longitudinal grooves provided for detachably connecting an elongate wire cap formed with upper and lower edge flanges which can be inserted respectively into the upper and lower grooves.

10. The supporting rack according to claim 7, wherein each runner has a central vertical web extending the length of the runner and two bottom flanges projecting from opposite sides of said vertical web, said at least one elongate frame member being detachably connected to one of the bottom flanges of each runner.

11. The supporting rack according to claim 7, further comprising a wind deflector and two end plates each adjustably mounted on a respective one of the runners and each connected to a respective bottom corner of said wind deflector in order to support the wind deflector, wherein each end plate is connected to top edges of the connecting channel of its respective runner by means of a threaded fastener.

12. The supporting rack according to claim 10, further comprising two flexible clips for connecting opposite ends of each of said at least one elongate frame member to two of the bottom flanges of said two runners, each flexible clip extending through a first hole formed in a respective one of the two bottom flanges and through a second hole formed in the elongate frame member and aligned with said first hole.

13. A supporting rack for a solar panel comprising:
a framework adapted for mounting on a support surface, said framework including two elongate runners that are spaced-apart and parallel to each other, and an elongate cross-member extending between and connecting the two runners; and
means for detachably and adjustably mounting said solar panel on top of said framework so that said solar panel in use extends at an acute angle to a plane defined by the two runners, said mounting means including a vertically extending, elongate connecting mechanism extending between and connecting rear sections of the runners and two rear clamp assemblies each having a back plate formed with a forwardly extending guideway defining a guide path, a J-clamp member having a top flange projecting towards said back plate and an integral guide pin slidably mounted in said guideway, and a threaded fastening device connecting said J-clamp member to said backplate whereby tightening the fastener device pulls said J-clamp member towards its back plate, said rear clamp assemblies being mounted on opposite end sections of said connecting mechanism and arranged to clamp a top edge frame member of the solar panel.

14. The supporting rack according to claim 13, wherein said connecting mechanism includes an elongate wind deflecting plate and two end plates each mounted on a respective one of said runners and each connected to a respective bottom corner of the wind deflecting plate.

15. The supporting rack according to claim 13, wherein said mounting means further includes two front clamp assemblies each mountable on a respective one of said runners and clamped to a front edge of the solar panel and wherein, during installation of the solar panel, said front clamp assemblies allow said solar panel to be pivoted rearwardly from an upright position to a sloping position where said top edge frame member can rest on the two rear clamp assemblies for clamping thereby.

16. The supporting rack according to claim 13, wherein each rear clamp assembly is bolted to said connecting mechanism.

17. The supporting rack according to claim 14, wherein each end plate is an angle member having a horizontal leg adjustably connected to a top of its respective runner and a vertical leg having two fastener holes for detachably connecting adjacent corners of two wind deflecting plates to the respective runner.

18. The supporting rack according to claim 13, wherein a front side of said J-clamp member is formed with a multi-sided recess to receive snuggly a head of the threaded fastening device, whereby engagement between said head and the sides of said recess prevent the head from rotating in said recess during said tightening of the fastening device.

* * * * *